United States Patent
Mukai

(10) Patent No.: US 10,511,247 B2
(45) Date of Patent: Dec. 17, 2019

(54) LINEAR CONVEYOR DEVICE AND DRIVE CONTROL METHOD THEREFOR

(71) Applicant: YAMAHA HATSUDOKI KABUSHIKI KAISHA, Iwata-shi, Shizuoka-ken (JP)

(72) Inventor: Masayuki Mukai, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 0 days.

(21) Appl. No.: 16/330,041

(22) PCT Filed: Sep. 26, 2016

(86) PCT No.: PCT/JP2016/078291
§ 371 (c)(1),
(2) Date: Mar. 1, 2019

(87) PCT Pub. No.: WO2018/055772
PCT Pub. Date: Mar. 29, 2018

(65) Prior Publication Data
US 2019/0214930 A1    Jul. 11, 2019

(51) Int. Cl.
*H02P 25/064* (2016.01)
*H02P 6/00* (2016.01)
(Continued)

(52) U.S. Cl.
CPC .......... *H02P 25/064* (2016.02); *H02K 11/21* (2016.01); *H02K 41/031* (2013.01); *H02P 6/006* (2013.01); *H02P 6/16* (2013.01)

(58) Field of Classification Search
CPC ...... H02K 11/21; H02K 41/02; H02K 41/031; H02P 25/064; H02P 6/006; H02P 6/16
See application file for complete search history.

(56) References Cited

U.S. PATENT DOCUMENTS 6,960,898 B2 * 11/2005 Sato ................. H02P 27/047
                                                 318/400.26
9,365,354 B2 * 6/2016 Takagi ................. H02P 25/06
(Continued)

FOREIGN PATENT DOCUMENTS

JP    2003-070225 A    3/2003
JP    2013-099192 A    5/2013
(Continued)

OTHER PUBLICATIONS

International Search Report issued in PCT/JP2016/078291; dated Dec. 13, 2016.

*Primary Examiner* — Thai T Dinh
(74) *Attorney, Agent, or Firm* — Studebaker & Brackett PC

(57) ABSTRACT

In a linear conveyor device, each driver in each of sensor structural bodies includes a sensor position calculation part, a position identification part and a power supply control part. The sensor position calculation part calculates sensor position data of a sensor which forms a sensor structural body to which the sensor position calculation part per se belongs based on first sensor distance data which is stored in a data storage part. The position identification part identifies the position of a slider based on addition data obtained by adding sensor position data by the sensor position calculation part and detection data by a sensor which forms the sensor structural body. Then, the power supply control part drives a linear motor by performing a power supply control of a linear motor stator corresponding to the sensor structural body based on an identification result obtained by the position identification part.

13 Claims, 10 Drawing Sheets

(51) Int. Cl.
*H02K 11/21* (2016.01)
*H02K 41/03* (2006.01)
*H02P 6/16* (2016.01)

(56) References Cited

U.S. PATENT DOCUMENTS

| | | | |
|---|---|---|---|
| 2002/0180279 A1 | 12/2002 | Faizullabhoy et al. | |
| 2014/0257554 A1 | 9/2014 | Takagi | |
| 2014/0292112 A1 | 10/2014 | Mukai | |
| 2015/0028098 A1* | 1/2015 | Kleinikkink | G06Q 90/00 |
| | | | 235/376 |
| 2015/0035458 A1 | 2/2015 | Takase et al. | |
| 2016/0361818 A1* | 12/2016 | Hiruma | B25J 9/1692 |
| 2019/0193942 A1* | 6/2019 | Hayashi | G01B 21/00 |

FOREIGN PATENT DOCUMENTS

| | | |
|---|---|---|
| JP | 2013-102562 A | 5/2013 |
| JP | 2015-033240 A | 2/2015 |

\* cited by examiner

FIG. 3
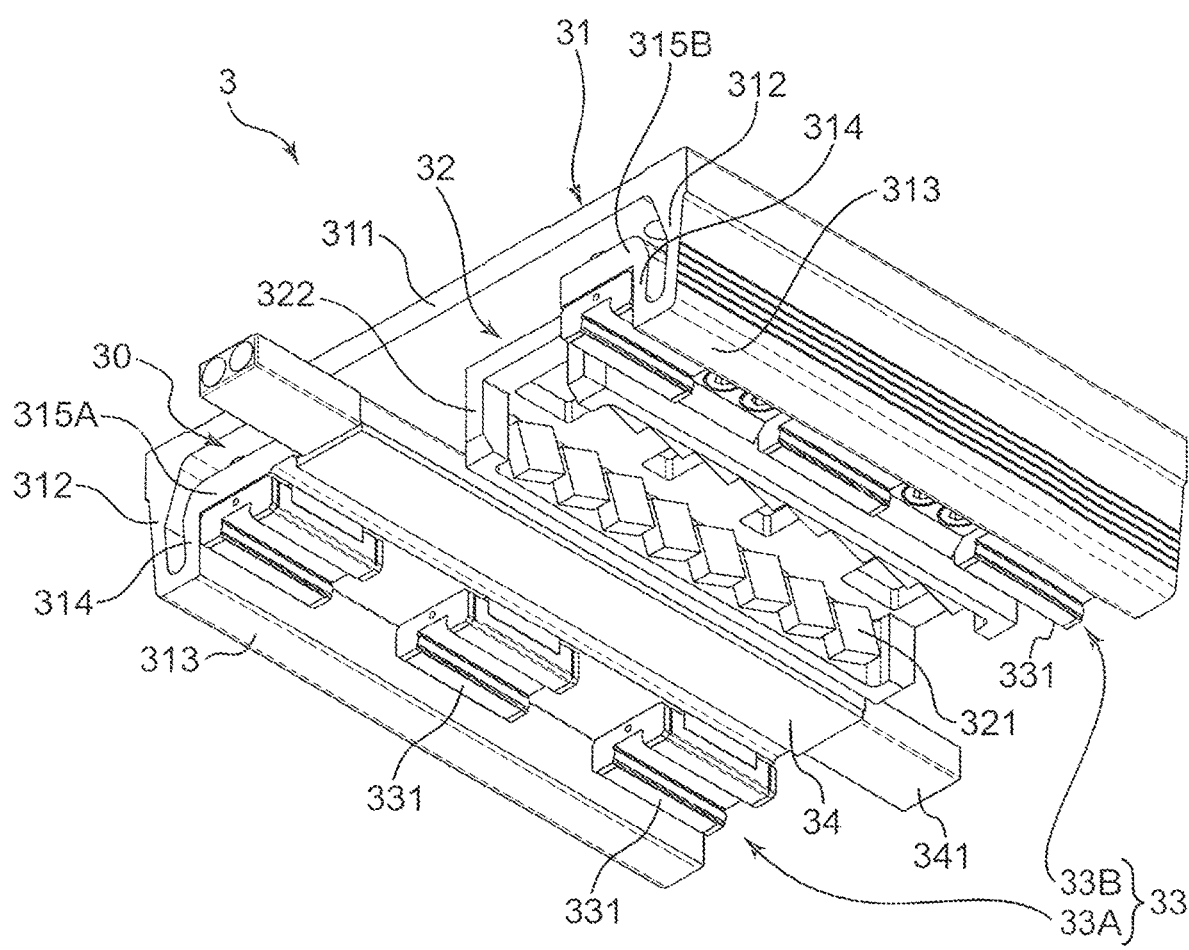
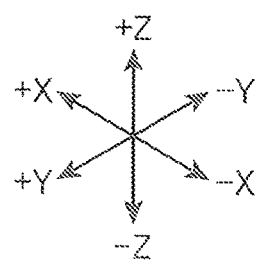

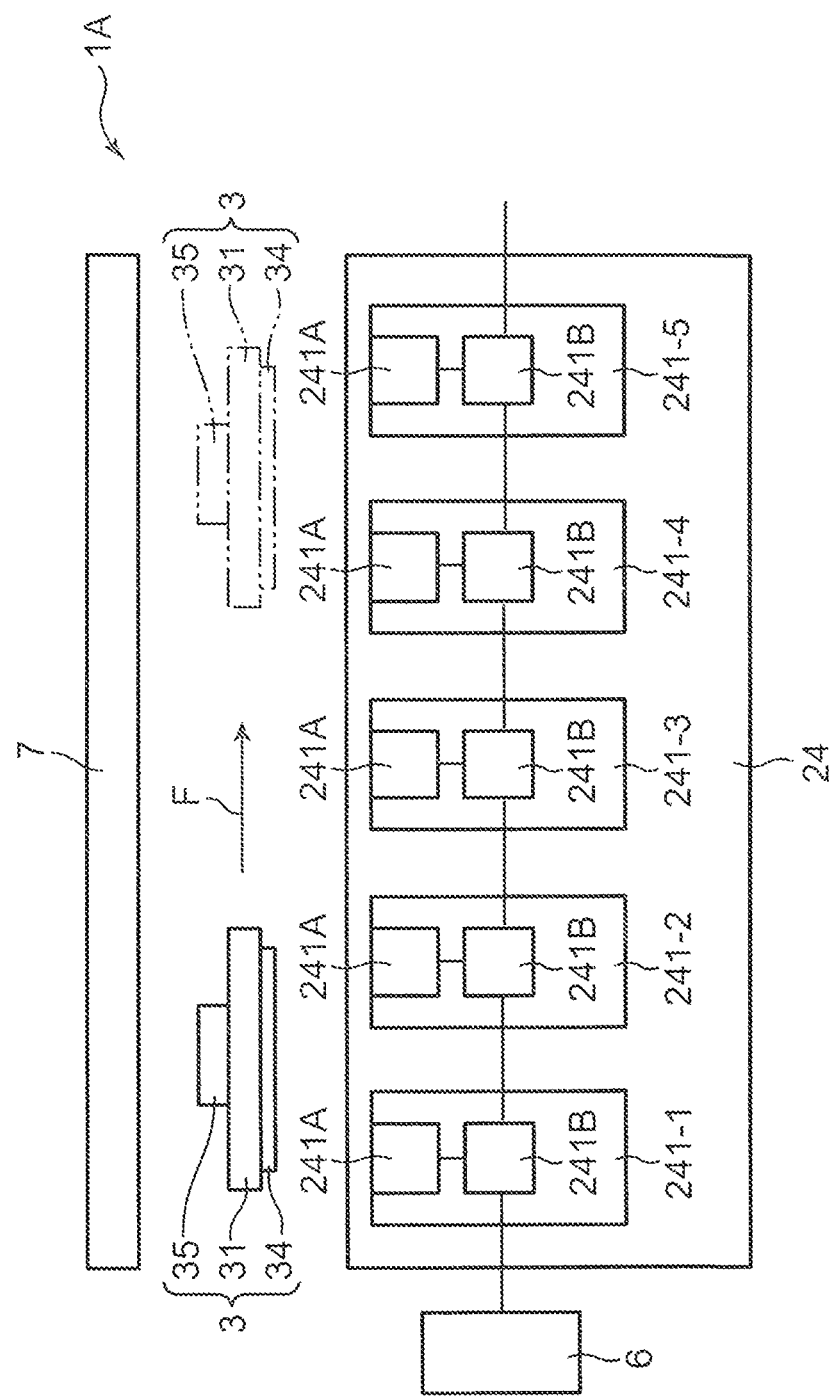

LINEAR CONVEYOR DEVICE AND DRIVE CONTROL METHOD THEREFOR

CROSS-REFERENCE TO RELATED APPLICATION

This application is a National Stage of International Patent Application No. PCT/JP2016/078291, filed Sep. 26, 2016, the entire content of which is incorporated herein by reference.

BACKGROUND

Technical Field

The present disclosure relates to a linear conveyor device which uses a linear motor as a drive source and a drive control method for the linear conveyor device.

Background Art

There has been known a linear conveyor device which uses a linear motor as a drive source, and moves a slider along a guide rail in a predetermined moving direction. In the case of a movable magnet type linear motor, the guide rail is assembled to a base frame on which a linear motor stator is mounted, and a linear motor mover is mounted on the slider. The linear motor stator is an electromagnet disposed parallel to the guide rail, and the linear motor mover is a permanent magnet. The linear motor is driven with the supply of electricity to the linear motor stator (electromagnet) and a propulsion force is given to the slider. A linear conveyor device includes a scale mounted on the slider and a sensor mounted on the base frame. The position of the slider is identified based on detection data obtained by the sensor, and a power supply control of the linear motor stator is performed based on the position of the slider whereby a drive control of the linear motor is performed.

For example, JP-A-2003-70225 discloses a linear conveyor device (linear motor system) having the above-mentioned configuration. In the linear conveyor device disclosed in JP-A-2003-70225, with respect to a plurality of sensors (encoder sensors) disposed on a moving path, a distance between the neighboring sensors is set smaller than a length of a scale (encoder magnet) attached to a slider (movable stage) along a moving direction. Detection data obtained by the respective sensors are transmitted to one motor controller. The motor controller is configured to identify the position of the slider based on detection data obtained by the respective sensors.

SUMMARY

In the above-mentioned linear conveyor device according to the background art, for example, with respect to the plurality of the sensors, focusing on two sensors that are a reference sensor disposed a most upstream in a moving direction of the slider and the neighboring sensor disposed adjacently to and downstream of the reference sensor in the moving direction, when the slider passes in a state where the slider strides over the two sensors, the motor controller identifies the position of the slider in the following manner. That is, the motor controller identifies the position of the slider based on the detection data obtained by the reference sensor, and identifies the position of the slider based on addition data obtained by adding predetermined sensor distance data indicative of a distance between two sensors to the detection data obtained by the neighboring sensor.

In such a configuration, it is ideal that the distance between the neighboring sensors be set to a fixed value with respect to the plurality of sensors. However, the respective sensors are arranged such that the distance between the sensors falls within a predetermined tolerance and hence, the distance between the sensors does not take a fixed value. Accordingly, there may be a case where the position of the slider identified based on detection data obtained by the reference sensor and the position of the slider identified based on addition data obtained by adding the predetermined sensor distance data to the detection data obtained by the neighboring sensor do not agree with each other. That is, when the slider passes in a state where the slider strides over two sensors, there may be a case where the position of the slider identified based on detection data obtained by one sensor and the position of the slider identified based on detection data obtained by the other sensor do not agree with each other. In such a case, it is necessary to identify the position of the slider using two pieces of different positional information relating to the slider, for example, by applying predetermined particular correction processing. Accordingly, a drive control of the linear motor in the linear conveyor device becomes complicated.

The present disclosure has been made in view of such circumstances, and the present disclosure provides a linear conveyor device which uses a linear motor as a drive source, wherein the position of the slider is identified without applying particular correction processing so that a drive control of the linear motor based on the position of the slider can be simplified, and a drive control method for such a linear conveyor device.

A linear conveyor device according to one aspect of the present disclosure includes a slider to which a linear motor mover and a scale are attached and which is configured to be movable in a predetermined moving direction; a stator unit in which a plurality of linear motor stators each of which faces the linear motor mover of the slider and forms a linear motor in cooperation with the linear motor mover are connected to each other in the moving direction; a motor drive unit in which a plurality of sensor structural bodies each of which includes a sensor which detects a relative displacement of the scale attached to the slider and a motor drive part for driving the linear motor are arranged along the moving direction corresponding to the plurality of respective linear motor stators; and a data storage part which stores first sensor distance data which is preliminarily measured. The first sensor distance data is data indicative of a distance along the moving direction between the sensors of the sensor structural bodies disposed adjacently to each other in the motor drive unit. Each of the respective motor drive parts in the motor drive unit includes a sensor position calculation part which calculates, based on the first sensor distance data, sensor position data indicative of a position of the sensor along the moving direction of the sensor which forms the sensor structural body to which the sensor position calculation part per se belongs; a position identification part which identifies the position of the slider based on addition data obtained by adding the sensor position data and detection data based on an output signal of the sensor which forms the sensor structural body to which the position identification part per se belongs; and a power supply control part which drives the linear motor by performing a power supply control of the linear motor stator which corresponds to the sensor structural body to which the power supply control part per se belongs based on an identification result by the position identification part.

A drive control method for a linear conveyor device according to another aspect of the present disclosure is a drive control method for a slider of a linear conveyor device which includes a slider to which a linear motor mover and a scale are attached and which is configured to be movable in a predetermined moving direction; a stator unit in which a plurality of linear motor stators each of which faces the linear motor mover of the slider and forms a linear motor in cooperation with the linear motor mover are connected to each other in the moving direction; and a motor drive unit in which a plurality of sensor structural bodies each of which includes a sensor which detects a relative displacement of the scale attached to the slider and a motor drive part for driving the linear motor are arranged along the moving direction corresponding to the plurality of respective linear motor stators. The drive control method for a linear conveyor device includes a data acquisition step of preliminarily measuring and acquiring first sensor distance data indicative of a distance along the moving direction between the sensors of the sensor structural bodies disposed adjacently to each other in the motor drive unit; a sensor position calculation step of making each of the respective motor drive parts in the motor drive unit calculate, based on the first sensor distance data, sensor position data indicative of a position of the sensor along the moving direction which forms the sensor structural body to which the motor drive part per se belongs; and a slider driving step of making each of the respective motor drive parts in the motor drive unit move the slider by driving the linear motor. The slider driving step includes a position identification step of identifying a position of the slider based on addition data obtained by adding the sensor position data which each of the respective motor drive parts calculates and detection data based on an output signal of the sensor which forms the sensor structural body to which the motor drive part belongs; and a power supply control step of driving the linear motor by performing a power supply control of the linear motor stator which corresponds to the sensor structural body to which the motor drive part belongs based on a particular result in the position identification step.

Objects, technical features, and advantages of the present disclosure will become more apparent from the following detailed description and accompanying drawings.

BRIEF DESCRIPTION OF THE DRAWINGS

FIG. 3 is a perspective view of a slider which the linear conveyor device includes;

FIG. 10 is a diagram for describing a modification of a drive control of the slider in the linear conveyor device.

DETAILED DESCRIPTION

Hereinafter, a linear conveyor device according to an embodiment of the present disclosure is described with reference to drawings. The directional relationship is described hereinafter using XYZ orthogonal coordinate axes. An X direction corresponds to a lateral direction (+X being a right side and −X being a left side), a Y direction corresponds to a longitudinal direction (+Y being a front side and −Y being a rear side), and a Z direction corresponds to a vertical direction (+Z being an upper side and −Z being a lower side).

[Overall Configuration of Linear Conveyor Device]

Figure 1:
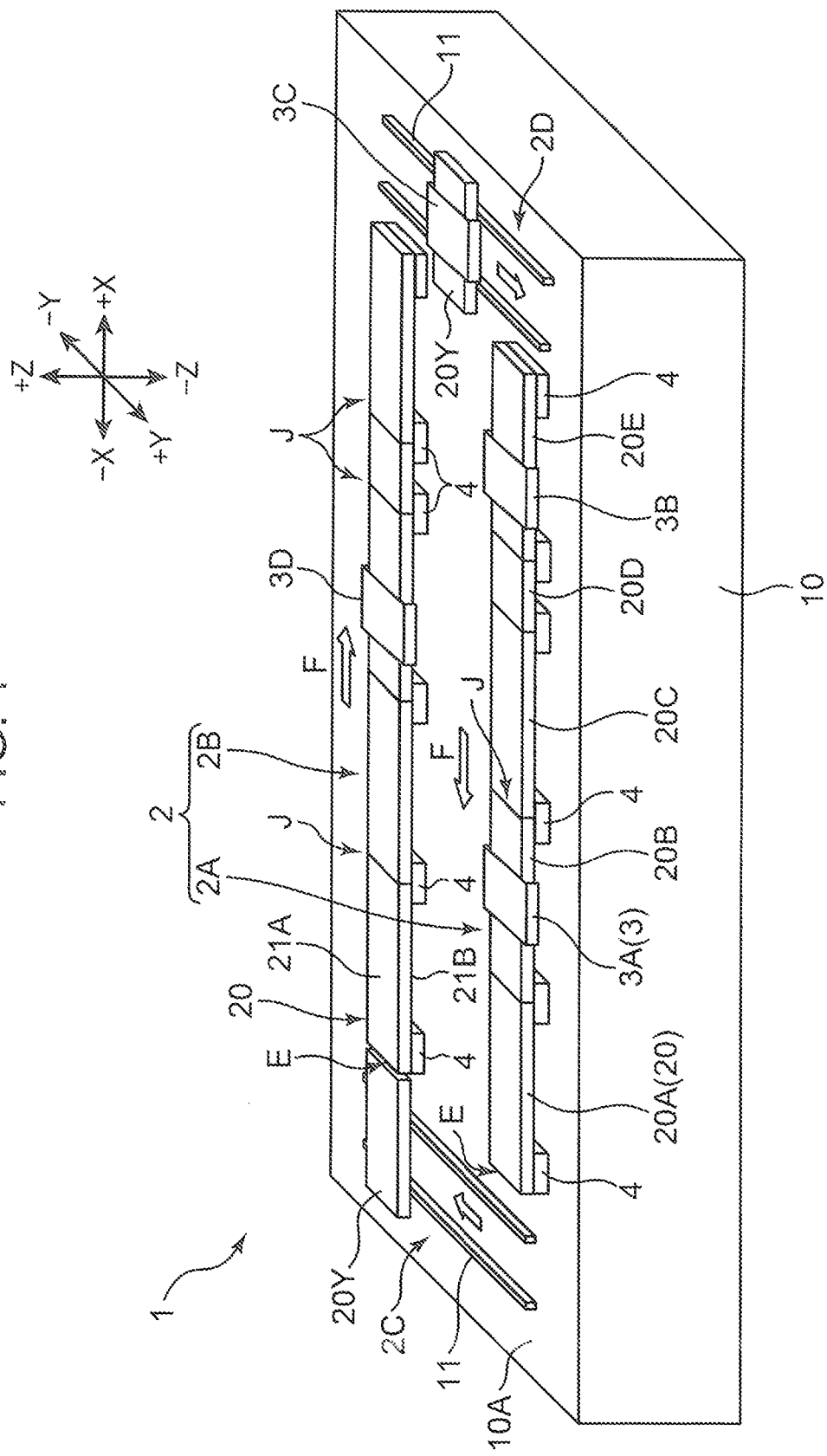
FIG. 1 is a perspective view schematically showing the overall configuration of a linear conveyor device according to one embodiment of the present disclosure.

FIG. 1 is a perspective view schematically showing the overall configuration of a linear conveyor device 1 according to one embodiment of the present disclosure. The linear conveyor device 1 includes a pair of straight-line conveyance parts 2 (a first straight-line conveyance part 2A and a second straight-line conveyance part 2B) which is mounted on a platform 10 and extends in the X direction; a first direction changing part 2C and a second direction changing part 2D which are positioned on a −X side end portion and on a +X side end portion of the straight-line conveyance parts 2, respectively; a slider 3 which moves along the straight-line conveyance parts 2; and base members 4 which support the straight-line conveyance parts 2 on the platform 10. The straight-line conveyance parts 2 are formed of the first straight-line conveyance part 2A disposed on the platform 10 on a +Y side and the second straight-line conveyance part 2B disposed on the platform 10 on a −Y side parallel to the first straight-line conveyance part 2A. The first and second direction changing parts 2C, 2D connect the straight-line conveyance parts 2A, 2B to each other on a −X side end portion and a +X side end portion thereof.

The first and second straight-line conveyance parts 2A, 2B are conveyance parts for moving the slider 3 in the X direction. The first and second direction changing parts 2C, 2D are conveyance parts for moving the slider 3 in the Y direction, and transfer the slider 3 between the first and second straight-line conveyance parts 2A, 2B. That is, the first and second direction changing parts 2C, 2D change a conveying direction of the slider 3. The first and second straight-line conveyance parts 2A, 2B are fixed-side units of the linear motor, and the slider 3 is a movable-side unit of the linear motor.

The first and second straight-line conveyance parts 2A, 2B are each formed by linearly connecting a plurality of modules 20 having a function of guiding the slider 3. The module 20 is a fixed-side unit block of the linear motor. The module 20 (a base frame 21 described later) has an upper surface 21A and a lower surface 21B which faces the platform 10. The module 20 is supported by the base member 4 in a state where the lower surface 21B separates from an upper surface 10A of the platform 10.

FIG. 1 shows an example where the first straight-line conveyance part 2A is formed of modules 20A, 20B, 20C, 20D, and 20E which are sequentially connected to each other from a −X direction to a +X direction. In FIG. 1, an example is exemplified where the module 20D has a length shorter than those of the other modules. The second straight-line conveyance part 2B also has substantially the same structure. In this manner, a moving path length of the slider 3 in the X direction can be set as desired by changing the number of modules 20 to be connected to each other or the combination of the modules 20 having different lengths.

The first and second direction changing parts 2C, 2D each include slide rails 11 and a changing module 20Y. The slide rails 11 are installed on the upper surface 10A of the platform 10 such that the slide rails 11 extend in the Y direction. The changing module 20Y is fitted on the slide rail 11 such that the changing module 20Y is movable in the Y direction along the slide rail 11. The changing module 20Y is movable between a terminal end portion E of the first straight-line conveyance part 2A and a terminal end portion E of the second straight-line conveyance part 2B, and is positioned and stopped with respect to the terminal end portions E by a drive mechanism not shown in the drawing.

The slider 3 is movable in a circulating manner on a circulatory moving path formed of the first and second straight-line conveyance parts 2A, 2B and the first and second direction changing parts 2C, 2D, the circulatory moving path being provided on the platform 10. FIG. 1 shows an example where four sliders 3A, 3B, 3C, and 3D are arranged on the circulatory moving path, and the sliders circulate in a slider moving direction F in a clockwise manner. The slider 3 moves from a +X side to a −X side of the first straight-line conveyance part 2A (also including a case where the slider 3 is moved in a reverse direction toward the +X side temporarily), and the slider 3 is transferred from the −X terminal end portion E to the changing module 20Y of the first direction changing part 2C. In a state where the slider 3 is mounted on the changing module 20Y, the changing module 20Y is moved in a −Y direction from the first straight-line conveyance part 2A to the second straight-line conveyance part 2B. Next, the slider 3 is transferred from the −X terminal end portion E to the second straight-line conveyance part 2B, and is moved toward the +X side. Then, the slider 3 is transferred to the changing module 20Y of the second direction changing part 2D, is moved in the +Y direction, and is transferred to the first straight-line conveyance part 2A again.

Although not shown in the drawing, along the circulatory moving path of the slider 3, various robots are disposed which perform the transfer of a workpiece such as a printed circuit board, an operation of mounting electronic parts and the like on the printed circuit board, for example. An upper surface of the slider 3 forms a placing part on which the workpiece or the like is placed. The slider 3 is intermittently moved on the first and second straight-line conveyance parts 2A, 2B such that the slider 3 is stopped at an operation position of a robot which performs one step, and is moved toward an operation position of a robot which performs a next step after an operation in the above-mentioned one step is finished.

The base member 4 is disposed between the platform 10 and lower surfaces 21B of the modules 20 at a connecting portion J between the modules 20, and positions and supports a pair of modules 20 to be connected to each other. Further, the base member 4 is also disposed at the terminal end portions E of the first and second straight-line conveyance parts 2A, 2B. The base member 4 is formed of a metal block made of metal having excellent rigidity such as aluminum.

[Overall Configuration of Module]

Figure 2:
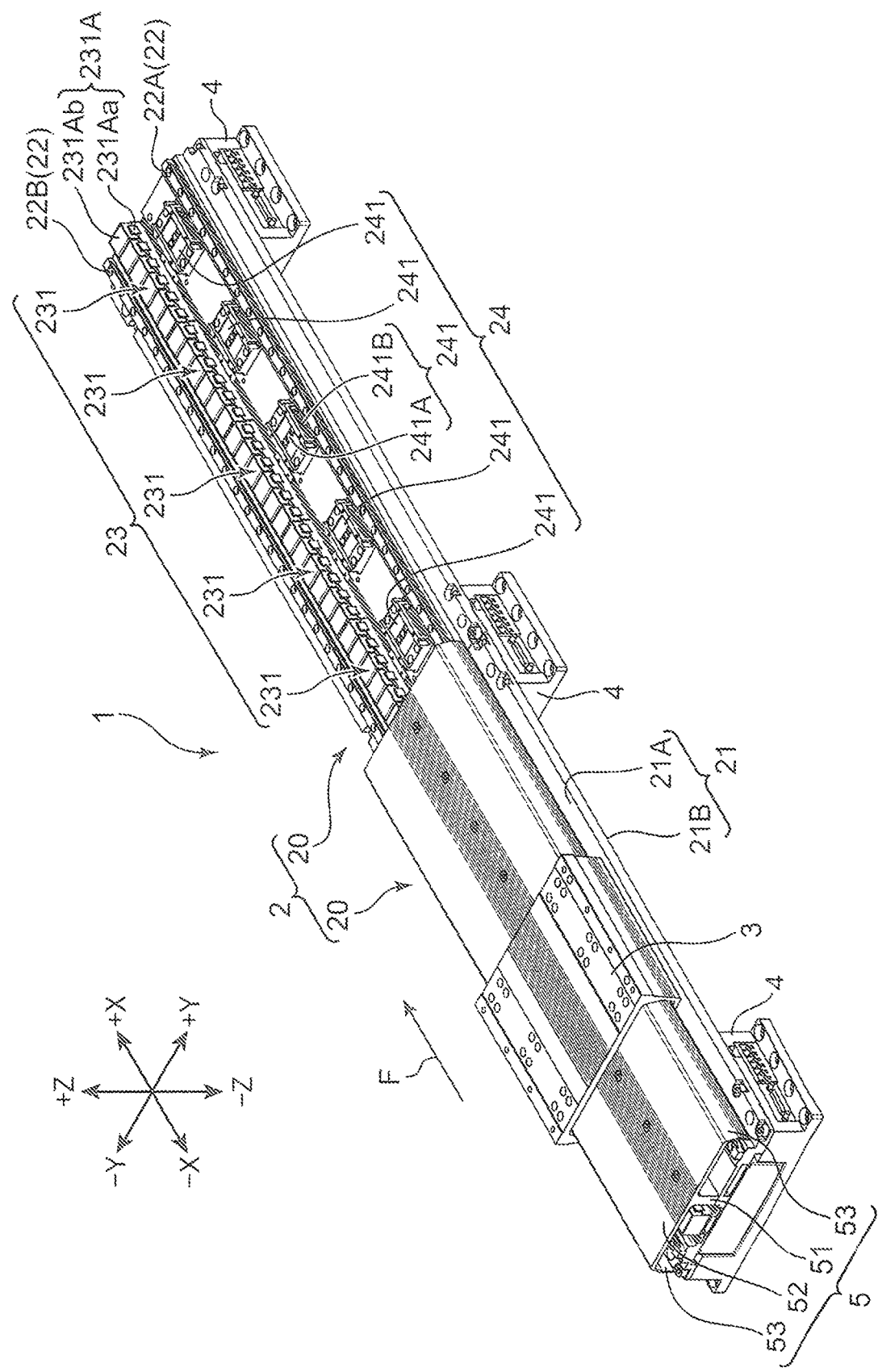
FIG. 2 is a perspective view of a connected body of two modules which form the linear conveyor device.

A specific example of the module 20 is described. FIG. 2 is a perspective view of a connected body of two modules 20 which form a part of the straight-line conveyance part 2.

FIG. 2 shows a state where a cover member 5 of one of two modules 20 is removed. Each module 20 includes a base frame 21, guide rails 22 (first guide rail 22A and second guide rail 22B), a stator unit 23, and a motor drive unit 24. In this embodiment, the cover member 5 is mounted on each of the modules 20.

The straight-line conveyance part 2 is formed of the connected body of the modules 20 which each include the cover member 5. The slider 3 is movably mounted on the straight-line conveyance part 2 in an extending direction of the straight-line conveyance part 2 in a mode where the slider 3 is fitted on the cover member 5. The modules 20 are supported by the base members 4 on the platform 10 while being positioned at the connecting portions J of the modules 20 and the terminal end portions E of the straight-line conveyance part 2, the platform 10 serving as a mounting base of the linear conveyor device 1.

The base frame 21 of the module 20 is a frame made of metal such as aluminum, and is a flat plate-like member which forms the upper surface 21A and the lower surface 21B of the above-mentioned module 20. The upper surface 21A is a surface on which the guide rail 22, the stator unit 23, and the motor drive unit 24 are mounted. The lower surface 21B is a surface which faces the upper surface 10A of the platform 10 with a predetermined distance therebetween, and is in contact with the base members 4.

The guide rail 22 is a member which guides the movement of the slider 3. The guide rail 22 is mounted on the upper surface 21A of the base frame 21, and is formed of a first guide rail 22A disposed on a +Y side; and a second guide rail 22B disposed on a −Y side parallel to the first guide rail 22A. By connecting end portions of the plurality of base frames 21 in the X direction to each other in a butting manner, a pair of unit guide rails 22A, 22B of the respective base frames 21 are connected to each other and hence, the guide rails 22A, 22B extending in a limitless manner can be formed.

The stator unit 23 is mounted on the upper surface 21A of the base frame 21 between the first guide rail 22A and the second guide rail 22B. In this embodiment, the stator unit 23 is disposed along the second guide rail 22B on a −Y side between the first guide rail 22A and the second guide rail 22B. The stator unit 23 is a structural body formed by connecting a plurality of linear motor stators 231 along the X direction. Each linear motor stator 231 is formed by arranging a plurality of electromagnets 231A in a row in the X direction, wherein each electromagnet 231A is formed by winding a coil 231Ab around a core 231Aa. The core 231Aa has a comb shape where an end portion of the core 231Aa on a +Y side forms a magnetic pole, and an end portion of the core 231Aa on a −Y side is connected with the neighboring core 231Aa. Each linear motor stator 231 faces a linear motor mover 32 attached to the slider 3 and described later, and forms a linear motor in cooperation with the linear motor mover 32.

The motor drive unit 24 is mounted on the upper surface 21A of the base frame 21 such that the motor drive unit 24 faces the stator unit 23. In this embodiment, the motor drive unit 24 is disposed along the first guide rail 22A on a +Y side between the first guide rail 22A and the second guide rail 22B. With such a configuration, the motor drive unit 24 faces the stator unit 23. The motor drive unit 24 is a unit where a plurality of sensor structural bodies 241 are respectively arranged in the X direction corresponding to the plurality of linear motor stators 231, the sensor structural bodies 241 each including a sensor 241A and a driver 241B, the sensor 241A being configured to detect a relative displacement of the scale 34 attached to the slider 3 described later which is attached to the slider 3, the driver 241B (one example of a motor drive part) being configured to drive the linear motor. The detail of the motor drive unit 24 is described later.

The cover member 5 is mounted on the upper surface 21A such that the cover member 5 covers the upper surface 21A of the base frame 21 (straight-line conveyance part 2). The cover member 5 is formed of an extruded molded body made of metal such as aluminum, and includes a support leg 51, a horizontal cover portion 52, and a pair of side surface cover portions 53.

The support leg 51 is a flat plate portion which extends in a vertical direction (Z direction) as viewed in cross section in the Y direction and extends in an elongated manner in the X direction, and is positioned in the vicinity of the center of the cover member 5 in the Y direction. The support leg 51 is fixed to the base frame 21. That is, the support leg 51 is provided on the upper surface 21A of the base frame 21 in an erected manner in a center region in the width direction. The horizontal cover portion 52 extends horizontally from an upper end of the support leg 51 toward the +Y side (one side in the width direction) and toward the −Y side (the other side in the width direction). The pair of side surface cover portions 53 respectively extend downward from end portions of the horizontal cover portion 52 on the +Y side and on the −Y side.

The horizontal cover portion 52 covers the upper surface 21A such that the horizontal cover portion 52 covers and conceals upper portions of the guide rails 22, the stator unit 23, and the motor drive unit 24 that are mounted on the upper surface 21A of the base frame 21. The side surface cover portions 53 cover outer sides of the first and second guide rails 22A, 22B. By mounting the cover member 5 in such a manner, it is possible to prevent the intrusion of contaminant and a foreign material into the upper surface 21A.

[Detail of Slider]

FIG. 3 is a perspective view of the slider 3 which the linear conveyor device 1 includes. The slider 3 includes a slider frame 31, the linear motor mover 32, a pair of guide blocks 33 (first guide block 33A, second guide block 33B), and the scale 34.

The slider frame 31 is a metal block formed of an extruded molded body made of metal such as aluminum, and has an upper surface serving as a placing part on which a workpiece is placed. The slider frame 31 has a fitting portion 30 which can be fitted on the base frame 21 from an end portion of the fitting portion 30 in the X direction, the base frame 21 having the cover member 5. The slider frame 31 includes an upper plate 311, a pair of side plates 312, a pair of bottom plates 313, a pair of inner side plates 314, a first lower plate 315A, and a second lower plate 315B.

The upper plate 311 is formed of a horizontal plate having the approximately same width as that of the base frame 21 in the Y direction and having a predetermined length in the X direction. An upper surface of the upper plate 311 serves as the placing part on which a workpiece is placed. The side plates 312, the bottom plates 313, the inner side plates 314, and the first and second lower plates 315A, 315B have the same length as that of the upper plate 311 in the X direction. The pair of side plates 312 is a pair of vertical plates respectively extending downward from end portions of the upper plate 311 on the +Y side and the −Y side. The pair of bottom plates 313 is a pair of horizontal plates extending from lower ends of the respective side plates 312, extending toward the center of the upper plate 311 in the width direction, and having a short length in the Y direction. The bottom plates 313 are portions of the slider 3 which project downward most.

The pair of inner side plates 314 is a pair of vertical plates respectively extending upward from inner side ends of the respective bottom plates 313. A vertical width of the inner side plate 314 is approximately a half of a vertical width of the side plate 312. The first lower plate 315A extends from upper ends of the inner side plates 314 on the +Y side toward the center of the slider frame 31 in the width direction (−Y direction). The second lower plate 315B extends from the upper end of the inner side plate 314 on the −Y side toward the center of the slider frame 31 in the width direction (+Y direction).

The upper plate 311, the side plates 312, the bottom plates 313, the inner side plates 314, and the first and second lower plates 315A, 315B form a portion having a shape which is fitted in the cover member 5, that is, the fitting portion 30. The fitting portion 30 defines a cavity in which the cover member 5 is received. In a state where the slider 3 is fitted on the module 20 and the cover member 5 is fitted on the fitting portion 30, the upper plate 311 is positioned on an upper side of the horizontal cover portion 52 of the cover member 5. The pair of side plates 312 is respectively positioned outside end portions of the horizontal cover portion 52 on the +Y side and the −Y side. The bottom plates 313 are positioned below lower edges of the side surface cover portions 53, and the inner side plates 314 are positioned on an inner surface side of the side surface cover portions 53. Upper surfaces of the first and second lower plates 315A, 315B face a lower surface of the upper plate 311 and lower surfaces of the first and second lower plates 315A, 315B face the upper surface 21A of the base frame 21.

The linear motor mover 32 includes a plurality of permanent magnets 321 arranged in the X direction; and a back yoke 322 which holds the permanent magnets 321. The back yoke 322 is a member which holds the permanent magnets 321 and forms a magnetic path. The back yoke 322 has the structure which opens downward, and electromagnets 231A (linear motor stator 231) are disposed between a pair of side plates which form the structure. The plurality of permanent magnets 321 are arranged on the pair of respective side plates of the back yoke 322 (surfaces of the side plates which face the cores 231Aa of the electromagnets 231A) such that an N pole and an S pole appear alternately. The linear motor mover 32 is mounted on the slider frame 31 at a position where the linear motor mover 32 faces the linear motor stator 231 in the vertical direction. The linear motor mover 32 forms the linear motor together with the linear motor stator 231 on a base frame 21 side. In response to a signal from a motor controller not shown in the drawings, an electric current of any one of a U phase, a V phase, and a W phase which have different phases is supplied to the linear motor stator 231 (the coils 231Ab of the electromagnets 231A). With such an operation, a magnetic propulsion force is generated due to an interaction between a magnetic flux generated by the coils 231Ab and a magnetic flux generated by the permanent magnets 321 which the linear motor mover 32 has, and the slider 3 can be moved in a slider moving direction F by the propulsion force.

The first and second guide blocks 33A, 33B are fitted on the first and second guide rails 22A, 22B, and are moved in the X direction while being guided by the first and second guide rails 22A, 22B. The first and second guide blocks 33A, 33B are mounted on a lower surface of the slider frame 31 at positions where the first and second guide blocks 33A, 33B face the first and second guide rails 22A, 22B.

The scale 34 is a magnetic scale attached to a holder 341 mounted on the slider frame 31 such that the magnetic scale faces the sensor 241A. The scale 34 is formed such that a plurality of permanent magnets are arranged in a row along the X direction at a predetermined pitch in a state where an N pole and an S pole are alternately changed.

[Detail of Motor Drive Unit]

Figure 4:
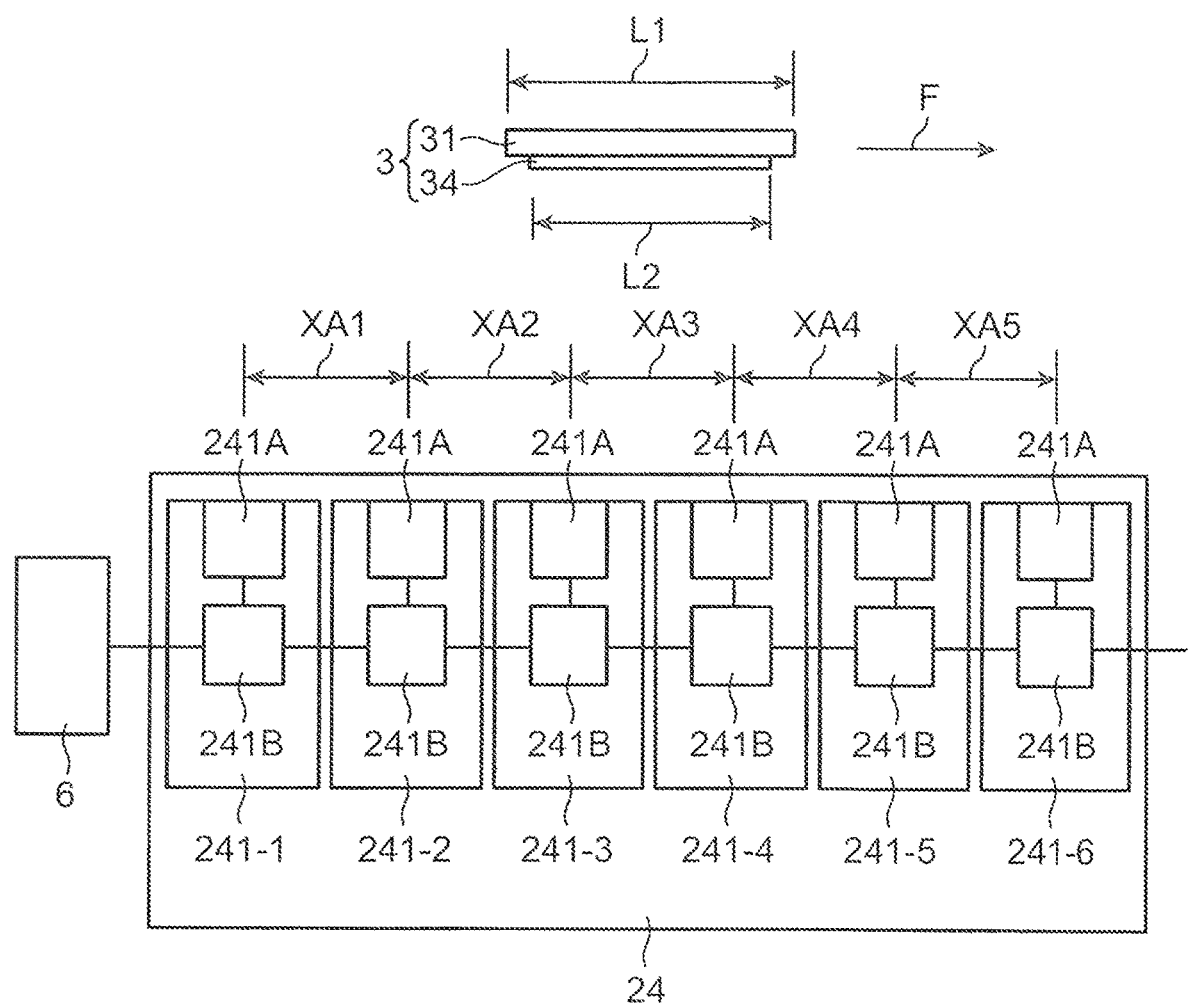
FIG. 4 is a diagram schematically showing a motor drive unit which the linear conveyor device includes.
Figure 5:
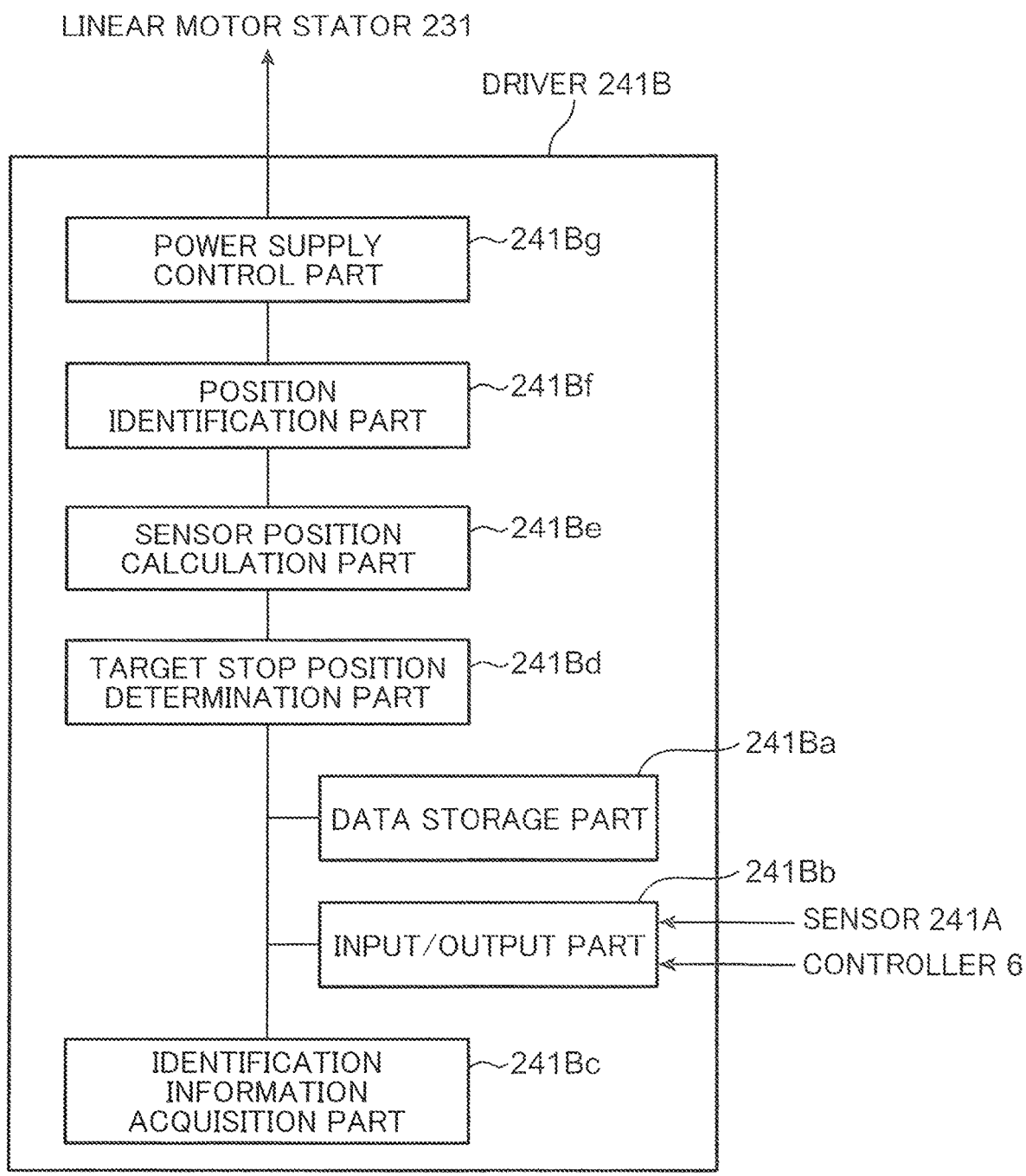
FIG. 5 is a block diagram showing a functional configuration of a driver in a sensor structural body which forms the motor drive unit.

The detail of the motor drive unit 24 is described with reference to FIG. 4 and FIG. 5. FIG. 4 is a diagram schematically showing the motor drive unit 24 which the linear conveyor device 1 includes. FIG. 5 is a block diagram showing the functional configuration of the drivers 241B of the sensor structural bodies 241 which form the motor drive unit 24.

As described previously, the motor drive unit 24 is the unit where the plurality of sensor structural bodies 241 each including the sensor 241A and the driver 241B are arranged along the X direction corresponding to the plurality of linear motor stators 231, respectively. In FIG. 4, an example is exemplified where six sensor structural bodies 241 are arranged in the X direction. As a matter of course, the number of sensor structural bodies 241 is not limited to six. In the description made hereinafter, in the case where it is necessary to distinguish the plurality of sensor structural bodies 241 from each other in the motor drive unit 24, in order from the sensor structural body disposed on a most upstream side in the slider moving direction F, the sensor structural bodies are referred to as the first sensor structural body 241-1, the second sensor structural body 241-2, the third sensor structural body 241-3, the fourth sensor structural body 241-4, the fifth sensor structural body 241-5, and the sixth sensor structural body 241-6.

In this embodiment, the linear conveyor device 1 includes a controller 6 (one example of a control part). As shown in FIG. 4, the controller 6 is connected to the drivers 241B of the respective sensor structural bodies 241 in the motor drive unit 24 through data communication. The controller 6 transmits target stop position data indicative of target stop positions of the sliders 3 to the respective drivers 241B.

The sensor 241A of the each sensor structural body 241 detects a relative displacement of the scale 34 attached to the slider 3, and outputs a 2-phase sinusoidal signal. The sensor 241A is a magnetic sensor such as a Hall element or an MR element, for example.

The driver 241B of the each sensor structural body 241 is a motor drive part for driving the linear motor which is formed of the linear motor stator 231 of the stator unit 23 and the linear motor mover 32 of the slider 3. The driver 241B includes a data storage part 241Ba, an input/output part 241Bb, an identification information acquisition part 241Bc, a target stop position determination part 241Bd, a sensor position calculation part 241Be, a position identification part 241Bf, and a power supply control part 241Bg.

The data storage part 241Ba of each driver 241B stores first sensor distance data. The first sensor distance data is data indicative of a distance along the slider moving direction F between the sensors 241A of the sensor structural bodies 241 disposed adjacently to each other in the motor drive unit 24. The first sensor distance data is preliminarily measured data. The above configuration is described with reference to FIG. 4. In the motor drive unit 24, the data storage part 241Ba of the driver 241B in the first sensor structural body 241-1 which forms the reference sensor structural body disposed on a most upstream side in the slider moving direction F stores, as the first sensor distance data, data "(zero)" which indicates that the sensor 241A of the first sensor structural body 241-1 is a sensor corresponding to an origin position.

In the motor drive unit 24, the data storage parts 241Ba of the drivers 241B in the second to sixth sensor structural bodies 241-2, 241-3, 241-4, 241-5, and 241-6 that are the remaining sensor structural bodies other than the first sensor structural body 241-1 which forms the reference sensor structural body store the following first sensor distance data. The data storage part 241Ba of the driver 241B in the second sensor structural body 241-2 stores, as first sensor distance data, a distance XA1 between the sensor 241A of the first sensor structural body 241-1 and the sensor 241A of the second sensor structural body 241-2. The data storage part 241Ba of the driver 241B in the third sensor structural body 241-3 stores, as first sensor distance data, a distance XA2 between the sensor 241A of the second sensor structural body 241-2 and the sensor 241A of the third sensor structural body 241-3. The data storage part 241Ba of the driver 241B in the fourth sensor structural body 241-4 stores, as first sensor distance data, a distance XA3 between the sensor 241A of the third sensor structural body 241-3 and the sensor 241A of the fourth sensor structural body 241-4. The data storage part 241Ba of the driver 241B in the fifth sensor structural body 241-5 stores, as first sensor distance data, a distance XA4 between the sensor 241A of the fourth sensor structural body 241-4 and the sensor 241A of the fifth sensor structural body 241-5. The data storage part 241Ba of the driver 241B in the sixth sensor structural body 241-6 stores, as first sensor distance data, a distance XA5 between the sensor 241A of the fifth sensor structural body 241-5 and the sensor 241A of the sixth sensor structural body 241-6.

For example, the controller 6 may include the data storage part 241Ba. However, it is desirable that the drivers 241B in the motor drive unit 24 each include the data storage part 241Ba as described above. With such a configuration, when the sensor position calculation part 241Be (described later) of each driver 241B in the motor drive unit 24 calculates sensor position data indicative of the position of the sensor 241A which forms the sensor structural body 241 to which the sensor position calculation part 241Be per se belongs, the sensor position calculation part 241Be can calculate the sensor position data by directly referencing first sensor distance data stored in the data storage part 241Ba.

The input/output part 241Bb of each driver 241B is a part to which an output signal from the sensor 241A which forms the sensor structural body 241 to which the input/output part 241Bb per se belongs and target stop position data from the controller 6 are inputted. The identification information acquisition part 241Bc of each driver 241B acquires unique identification information of the slider 3.

The sensor position calculation part 241Be of each driver 241B calculates, based on first sensor distance data stored in the data storage part 241Ba, sensor position data indicative of the position along the slider moving direction F of the sensor 241A which forms the sensor structural body 241 to which the sensor position calculation part 241Be per se belongs. The sensor position data calculated by the sensor position calculation part 241Be is stored in the data storage part 241Ba. The above processing is described with reference to FIG. 4. In the motor drive unit 24, the sensor position calculation part 241Be of the driver 241B in the first sensor structural body 241-1 that is the reference sensor structural body disposed on a most upstream side in the slider moving direction F calculates sensor position data using the position of the sensor 241A which forms the first sensor structural body 241-1 as the origin position (0 "zero").

In the motor drive unit 24, the sensor position calculation parts 241Be of the drivers 241B in the second to sixth sensor structural bodies 241-2, 241-3, 241-4, 241-5, and 241-6 that are the remaining sensor structural bodies other than the first sensor structural body 241-1 which forms the reference sensor structural body calculate sensor position data by cumulatively adding the first sensor distance data from the sensor 241A which forms the first sensor structural body 241-1 to the sensors 241A which form the second to sixth sensor structural bodies 241-2, 241-3, 241-4, 241-5, and 241-6.

To describe specifically, the sensor position calculation part 241Be of the driver 241B in the second sensor structural body 241-2 calculates sensor position data by adding first sensor distance data indicated by the distance XA1 to the origin position (0 "zero") calculated by the sensor position calculation part 241Be of the driver 241B in the first sensor structural body 241-1. The sensor position calculation part 241Be of the driver 241B in the third sensor structural body 241-3 calculates sensor position data by cumulatively adding the first sensor distance data respectively indicated by the distance XA1 and the distance XA2. The sensor position calculation part 241Be of the driver 241B in the fourth sensor structural body 241-4 calculates sensor position data by cumulatively adding the first sensor distance data respectively indicated by the distance XA1 to the distance XA3. The sensor position calculation part 241Be of the driver 241B in the fifth sensor structural body 241-5 calculates sensor position data by cumulatively adding the first sensor distance data respectively indicated by the distance XA1 to the distance XA4. The sensor position calculation part 241Be of the driver 241B in the sixth sensor structural body 241-6 calculates sensor position data by cumulatively adding the first sensor distance data respectively indicated by the distance XA1 to the distance XA5.

It is desirable that the first sensor distance data stored in the data storage part 241Ba of each driver 241B be data measured based on detection data by the sensor 241A in a state where the slider 3 is disposed striding over between the sensors 241A of the sensor structural bodies 241 disposed adjacently to each other in the motor drive unit 24. With such a configuration, the first sensor distance data used when the sensor position calculation part 241Be of each driver 241B calculates the sensor position data is used as data measured directly based on detection data by each sensor 241A in the motor drive unit 24 which the linear conveyor device 1 includes. Accordingly, accuracy of the sensor position data calculated by the sensor position calculation part 241Be is increased.

The target stop position determination part 241Bd of each driver 241B determines, based on sensor position data calculated by the sensor position calculation part 241Be, whether or not the target stop position which the target stop position data transmitted from the controller 6 indicates is a sensor facing position at which the slider 3 stops in an facing manner with the sensor 241A which forms the sensor structural body 241 to which the target stop position determination part 241Bd per se belongs.

The position identification part 241Bf of each driver 241B identifies the position of the slider 3 based on addition data obtained by adding sensor position data calculated by the sensor position calculation part 241Be and detection data based on an output signal of the sensor 241A which forms the sensor structural body 241 to which the position identification part 241Bf per se belongs.

In such a configuration, a length L1 of the slider 3 along the slider moving direction F of the slider frame 31 (slider length) is set slightly larger than a length L2 of the scale 34 attached to the slider 3 along the slider moving direction F (scale length). The scale length L2 is set greater than the distance between the sensors 241A indicated by the first sensor distance data.

In the example shown in FIG. 4, a length along the slider moving direction F of the motor drive unit 24 formed by connecting six sensor structural bodies 241 (the first to sixth sensor structural bodies 241-1 to 241-6) is "600 mm", for example. On the other hand, the distance between the sensors 241A indicated by the first sensor distance data is set to 100 mm on average, for example. In this case, the slider length L1 of the slider 3 is set to "120 mm", for example, and the scale length L2 of the scale 34 is set to "110 mm", for example. This scale length L2 (L2=110 mm) is set larger than the distance between the sensors 241A indicated by the first sensor distance data.

Figure 6:
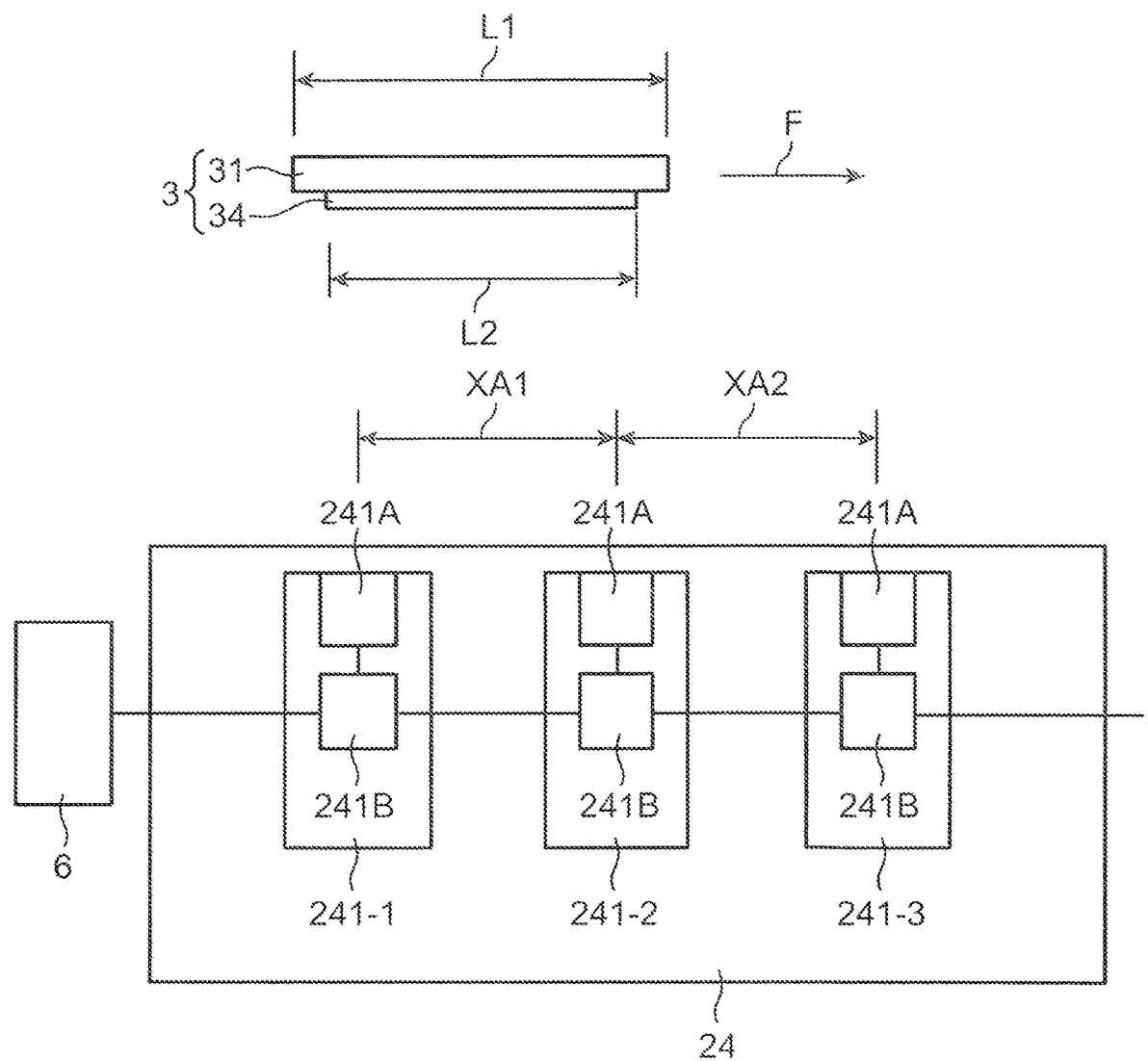
FIG. 6 is a diagram showing a modification of the motor drive unit.

On the other hand, in a modification of the motor drive unit 24 shown in FIG. 6, a length along the slider moving direction F of the motor drive unit 24 formed by connecting three sensor structural bodies 241 (the first to third sensor structural bodies 241-1 to 241-3) is "600 mm", for example. On the other hand, the distance between the sensors 241A indicated by the first sensor distance is set to 200 mm on average, for example. In this manner, even when the number of the sensor structural bodies 241 which form the motor drive unit 24 is decreased so that the distance between the sensors 241A is widened, it is sufficient to set the scale length L2 of the scale 34 greater than the distance between the sensors 241A indicated by the first sensor distance data.

With such a configuration, when the slider 3 passes in a state where the slider 3 strides over between the sensor structural bodies 241 disposed adjacently to each other in the motor drive unit 24, the scale 34 attached to the slider 3 faces the respective sensors 241A of the respective sensor structural bodies 241. Accordingly, it is possible to identify the position of the slider 3 by the position identification part 241Bf using detection data obtained by the respective sensors 241A. As a result, the continuous position identification of the slider 3 along the slider moving direction F can be performed.

The power supply control part 241Bg of each driver 241B performs a power supply control of the linear motor stator 231 corresponding to the sensor structural body 241 to which the power supply control part 241Bg per se belongs based on a position identification result of the slider 3 by the position identification part 241Bf. With such a power supply control, the linear motor which is formed of the linear motor stator 231 and the linear motor mover 32 attached to the slider 3 is driven. In this embodiment, the power supply control part 241Bg of the driver 241B which includes the target stop position determination part 241Bd which determines that the target stop position which the target stop position data transmitted from the controller 6 indicates is the sensor facing position at which the slider 3 is stopped in an facing manner with the sensor 241A which forms the sensor structural body 241 to which the power supply control part 241g per se belongs performs the power supply control of the linear motor stator 231 so as to stop the slider 3 at the target stop position.

<Drive Control of Motor Drive Unit>

A control operation by the drivers 241B of the respective sensor structural bodies 241 in the motor drive unit 24 is specifically described hereinafter with reference to FIG. 4 and FIG. 5.

Firstly, first sensor distance data indicative of a distance between the sensors 241A of the sensor structural bodies 241 disposed adjacently to each other in the motor drive unit 24 is preliminarily measured and acquired (data acquisition step). The first sensor distance data acquired in this manner is stored in the data storage part 241Ba. In this embodiment, the first sensor distance data is calculated by obtaining a differential between detection data obtained by the sensors 241A in a state where the slider 3 strides over between the sensors 241A of the sensor structural bodies 241 disposed adjacently to each other in the motor drive unit 24. When a design value between the sensors 241A of the sensor structural bodies 241 disposed adjacently to each other in the motor drive unit 24 is "100 mm", for example, assume that the preliminarily measured distance XA1 is "99.78 mm", the preliminarily measured distance XA2 is "100.25 mm", the preliminarily measured distance XA3 is "99.99 mm", the preliminarily measured distance XA4 is "100.31 mm", and the preliminarily measured distance XA5 is "99.67 mm".

Next, the sensor position calculation part 241Be of each driver 241B calculates, based on first sensor distance data stored in the data storage part 241Ba, sensor position data of the sensor 241A which forms the sensor structural body 241 to which the sensor position calculation part 241Be per se belongs, and the calculated sensor position data is stored in the data storage part 241Ba (sensor position calculation step).

The sensor position calculation part 241Be of the driver 241B in the first sensor structural body 241-1 calculates sensor position data as an origin position (0 "zero"). The sensor position calculation part 241Be of the driver 241B in the second sensor structural body 241-2 calculates sensor position data "99.78 mm" by adding the distance XA1=99.78 mm as the first sensor distance data to the origin position (0 "zero"). The sensor position calculation part 241Be of the driver 241B in the third sensor structural body 241-3 calculates sensor position data "200.03 mm" by cumulatively adding the distance XA1=99.78 mm and the distance XA2=100.25 mm as the first sensor distance data. The sensor position calculation part 241Be of the driver 241B in the fourth sensor structural body 241-4 calculates sensor position data "300.02 mm" by cumulatively adding the distance XA1=99.78 mm, the distance XA2=100.25 mm, and the distance XA3=99.99 mm as the first sensor distance data. The sensor position calculation part 241Be of the driver 241B in the fifth sensor structural body 241-5 calculates sensor position data "400.33 mm" by cumulatively adding the distance XA1=99.78 mm, the distance XA2=100.25 mm, the distance XA3=99.99 mm, and the distance XA4=100.31 mm as the first sensor distance data. The sensor position calculation part 241Be of the driver 241B in the sixth sensor structural body 241-6 calculates sensor position data "500.00 mm" by cumulatively adding the distance XA1=99.78 mm, the distance XA2=100.25 mm, the distance XA3=99.99 mm, the distance XA4=100.31 mm, and the distance XA5=99.67 mm as the first sensor distance data.

Next, the identification information acquisition part 241Bc of each driver 241B acquires unique identification information of the slider 3 (identification information acquisition step). Next, the target stop position determination part 241Bd of each driver 241B determines, based on sensor position data calculated by the sensor position calculation part 241Be, whether or not the target stop position which the target stop position data transmitted from the controller 6 and inputted to the target stop position determination part 241Bd via the input/output part 241Bb indicates is the sensor facing position (target stop position determination step). For example, assume that the target stop position which the target stop position data transmitted from the controller 6 indicates is the position away from the sensor 241A of the first sensor structural body 241-1 by "99.87 mm" in the slider moving direction F. In this case, the target stop position of the slider 3 is the position which faces the respective sensors 241A of the first sensor structural body 241-1 and the second sensor structural body 241-2. At this stage of the operation, detection data based on an output signal from the sensor 241A of the first sensor structural body 241-1 is "99.87 mm", and detection data based on an output signal from the sensor 241A of the second sensor structural body 241-2 disposed at the position away from the sensor 241A by the distance XA1=99.78 mm is "0.09 mm".

Next, the position identification parts 241Bf of the drivers 241B of the first sensor structural body 241-1 and the second sensor structural body 241-2 identify the position of the slider 3 based on addition data obtained by adding sensor position data calculated by the sensor position calculation parts 241Be and detection data based on output signals of the sensors 241A which form the sensor structural bodies 241 to which the position identification parts 241Bf per se belong (position identification step).

Specifically, the position identification part 241Bf of the driver 241B in the first sensor structural body 241-1 identifies the position of the slider 3 based on addition data "99.87 mm" obtained by adding the origin position (0 "zero") which the sensor position calculation part 241Be of the driver 241B to which the position identification part 241Bf per se belongs calculates and detection data "99.87 mm" based on an output signal from the sensor 241A of the first sensor structural body 241-1. That is, a position identification result of the slider 3 by the position identification part 241Bf of the driver 241B in the first sensor structural body 241-1 is "99.87 mm".

On the other hand, the position identification part 241Bf of the driver 241B in the second sensor structural body 241-2 identifies the position of the slider 3 based on addition data "99.87 mm" obtained by adding sensor position data "99.78 mm" (an addition value obtained by adding origin position (0 "zero") and the distance XA1=99.78 mm) which the sensor position calculation part 241Be of the driver 241B to which the position identification part 241Bf per se belongs calculates and detection data "0.09 mm" based on an output signal from the sensor 241A of the second sensor structural body 241-2. That is, a position identification result of the slider 3 by the position identification part 241Bf of the driver 241B in the second sensor structural body 241-2 is "99.87 mm".

In this manner, when the slider 3 passes in a state where the slider 3 strides over between the sensor structural bodies 241 disposed adjacently to each other, the position of the slider 3 identified by the position identification part 241Bf in the driver 241B of one sensor structural body 241 and the position of the slider 3 identified by the position identification part 241Bf in the driver 241B of another sensor structural body 241 agree with each other. This is because a distance between the sensors 241A of the sensor structural bodies 241 disposed adjacently to each other is considered to fall within a predetermined tolerance so that even when the distance between the sensors 241A does not take a fixed value, with respect to addition data used for identifying the position of the slider 3, the sensor position data added to detection data obtained by the sensor 241A is data calculated based on preliminarily measured first sensor distance data. Accordingly, in the drivers 241B of the respective sensor structural bodies 241 disposed adjacently to each other, it is unnecessary to apply predetermined particular correction processing of the background art for making identification results obtained by the position identification parts 241Bf agree with each other. Further, it is also unnecessary to perform cooperative processing between the respective motor drive parts.

Next, the power supply control parts 241Bg of the drivers 241B of the first sensor structural body 241-1 and the second sensor structural body 241-2 perform a power supply control of the linear motor stators 231 respectively corresponding to the first sensor structural body 241-1 and the second sensor structural body 241-2 for stopping the slider 3 at the target stop position based on the position identification result of the slider 3 by the position identification parts 241Bf (power supply control step).

As described previously, in the linear conveyor device 1 according to this embodiment, in the respective drivers 241B of the sensor structural bodies 241 disposed adjacently to each other, no particular processing is necessary for making the identification results obtained by the position identification parts 241Bf agree with each other. Accordingly, it is possible to provide the linear conveyor device 1 where a drive control of the linear motor based on the position identification result of the slider 3 can be simplified.

[Connection of Motor Drive Units]

Figure 7:
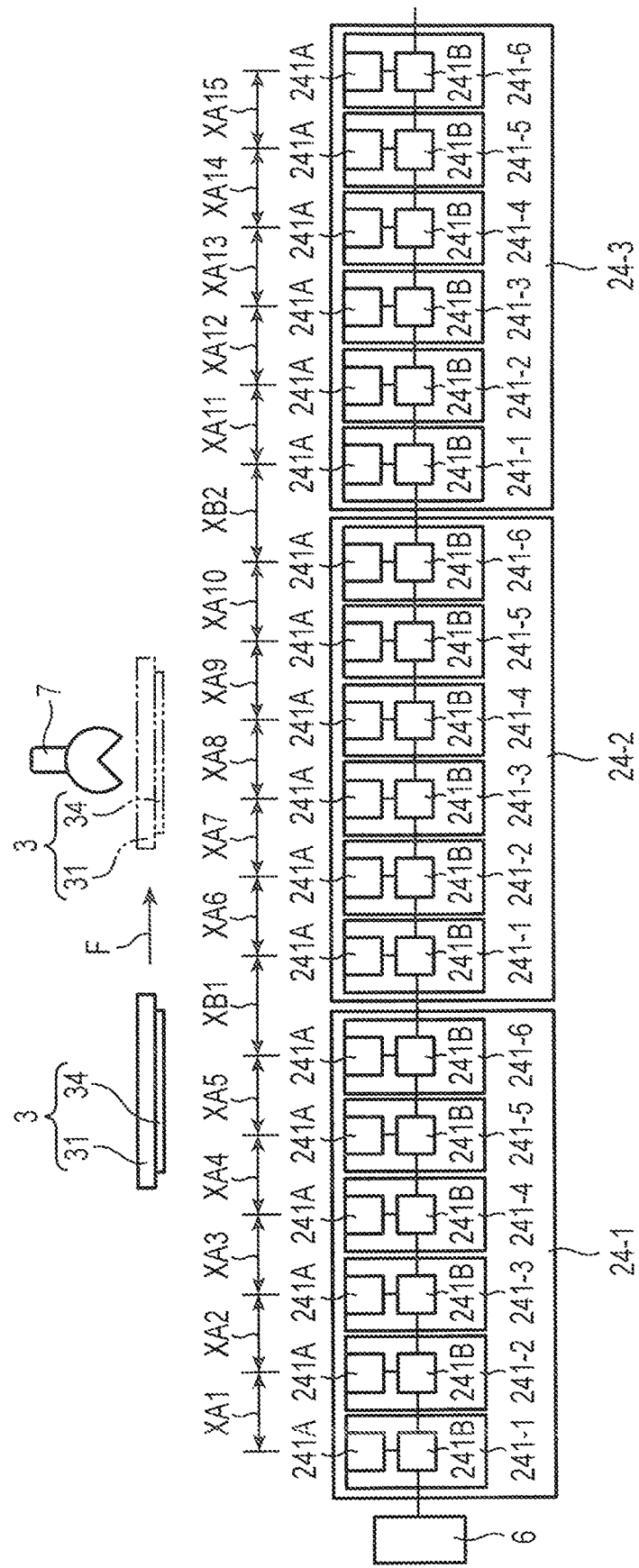
FIG. 7 is a diagram schematically showing a connection state of a plurality of motor drive units.

In the linear conveyor device 1 according to this embodiment, the plurality of modules 20 are connected to each other so that the plurality of stator units 23 are connected to each other along the slider moving direction F and the plurality of motor drive units 24 are connected to each other along the slider moving direction F. In the plurality of motor drive units 24, the motor drive units 24 disposed adjacently to each other are detachably connected to each other. Due to such a detachable configuration, it is possible to exchange the motor drive unit 24 depending on a usage. FIG. 7 is a diagram schematically showing a connection state of the plurality of motor drive units 24. FIG. 7 shows the example where three motor drive units 24 are arranged along the X direction. It is needless to say that the number of motor drive units 24 is not limited to three. In the description made hereinafter, when it is necessary to distinguish the plurality of motor drive units 24 from each other, the motor drive units 24 are referred to as the first motor drive unit 24-1, the second motor drive unit 24-2, and the third motor drive unit 24-3 in order from the motor drive unit 24 on a most upstream side in the slider moving direction F.

<Reference Motor Drive Unit>

Firstly, out of the plurality of motor drive units 24, the description is made with respect to the first motor drive unit 24-1 which forms the reference motor drive unit disposed on the most upstream side in the slider moving direction F. The data storage part 241Ba of each driver 241B in each sensor structural body 241 of the first motor drive unit 24-1 stores first sensor distance data. In the first motor drive unit 24-1, the data storage part 241Ba of the driver 241B in the first sensor structural body 241-1 which forms the first reference sensor structural body disposed on the most upstream side in the slider moving direction F stores, as first sensor distance data, data "0 (zero)" which indicates that the sensor 241A of the first sensor structural body 241-1 is a sensor corresponding to the origin position.

In the first motor drive unit 24-1, the data storage parts 241Ba of the drivers 241B in the second to sixth sensor structural bodies 241-2, 241-3, 241-4, 241-5, and 241-6 which form the remaining first sensor structural bodies other than the first sensor structural body 241-1 which forms the first reference sensor structural body store the following first sensor distance data. The data storage part 241Ba of the driver 241B in the second sensor structural body 241-2 stores, as the first sensor distance data, the distance XA1 between the sensor 241A of the first sensor structural body 241-1 and the sensor 241A of the second sensor structural body 241-2. The data storage part 241Ba of the driver 241B in the third sensor structural body 241-3 stores, as the first sensor distance data, the distance XA2 between the sensor 241A of the second sensor structural body 241-2 and the sensor 241A of the third sensor structural body 241-3. The data storage part 241Ba of the driver 241B in the fourth sensor structural body 241-4 stores, as the first sensor distance data, the distance XA3 between the sensor 241A of the third sensor structural body 241-3 and the sensor 241A of the fourth sensor structural body 241-4. The data storage part 241Ba of the driver 241B in the fifth sensor structural body 241-5 stores, as the first sensor distance data, the distance XA4 between the sensor 241A of the fourth sensor structural body 241-4 and the sensor 241A of the fifth sensor structural body 241-5. The data storage part 241Ba of the driver 241B in the sixth sensor structural body 241-6 stores, as the first sensor distance data, the distance XA5 between the sensor 241A of the fifth sensor structural body 241-5 and the sensor 241A of the sixth sensor structural body 241-6.

The sensor position calculation part 241Be of each driver 241B in each sensor structural body 241 of the first motor drive unit 24-1 calculates, based on the first sensor distance data stored in the data storage part 241Ba, sensor position data indicative of the position along the slider moving direction F of the sensor 241A which forms the sensor structural body 241 to which the sensor position calculation part 241Be per se belongs. The sensor position data calculated by the sensor position calculation part 241Be is stored in the data storage part 241Ba. The above-mentioned configuration is described with reference to FIG. 7. In the first motor drive unit 24-1, the sensor position calculation part 241Be of the driver 241B in the first sensor structural body 241-1 calculates the sensor position data using the position of the sensor 241A which forms the first sensor structural body 241-1 as the origin position (0 "zero").

In the first motor drive unit 24-1, the sensor position calculation parts 241Be of the drivers 241B in the second to sixth sensor structural bodies 241-2, 241-3, 241-4, 241-5, and 241-6 calculate sensor position data by cumulatively adding the first sensor distance data from the sensor 241A which forms the first sensor structural body 241-1 to the sensors 241A which form the second to sixth sensor structural bodies 241-2, 241-3, 241-4, 241-5, and 241-6.

To describe specifically, the sensor position calculation part 241Be of the driver 241B in the second sensor structural body 241-2 calculates sensor position data by adding first sensor distance data indicated by the distance XA1 to the origin position (0 "zero") calculated by the sensor position calculation part 241Be of the driver 241B in the first sensor structural body 241-1. The sensor position calculation part 241Be of the driver 241B in the third sensor structural body 241-3 calculates sensor position data by cumulatively adding the first sensor distance data respectively indicated by the distance XA1 and the distance XA2. The sensor position calculation parts 241Be of the drivers 241B in the fourth to sixth sensor structural bodies 241-4 to 241-6 calculate the sensor position data in the same manner as above.

The position identification part 241Bf of each driver 241B in each sensor structural body 241 of the first motor drive unit 24-1 identifies the position of the slider 3 based on addition data obtained by adding sensor position data calculated by the sensor position calculation part 241Be and detection data based on an output signal of the sensor 241A which forms the sensor structural body 241 to which the position identification part 241Bf per se belongs.

The power supply control part 241Bg of each driver 241B in each sensor structural body 241 of the first motor drive unit 24-1 performs a power supply control of the linear motor stator 231 corresponding to the sensor structural body 241 to which the power supply control part 241Bg per se belongs based on a position identification result of the slider 3 by the position identification part 241Bf. With such a power supply control, the linear motor which is formed of the linear motor stator 231 and the linear motor mover 32 attached to the slider 3 is driven.

In this embodiment, the power supply control part 241Bg of the driver 241B which includes the target stop position determination part 241Bd which determines that the target stop position which the target stop position data transmitted from the controller 6 indicates is the sensor facing position at which the slider 3 is stopped in an facing manner with the sensor 241A which forms the sensor structural body 241 to which the power supply control part 241g belongs performs the power supply control of the linear motor stator 231 so as to stop the slider 3 at the target stop position. In the example shown in FIG. 7, an operation position of the robot 7 is the target stop position.

<Remaining Motor Drive Units>

Next, the description is made with respect to the second and third motor drive units 24-2, 24-3 which form the remaining motor drive units other than the first motor drive unit 24-1 which forms the reference motor drive unit out of the plurality of motor drive units 24.

Data storage parts 241Ba of the respective drivers 241B in the respective sensor structural bodies 241 of the second and third motor drive units 24-2, 24-3 store first sensor distance data and second sensor distance data respectively. In this embodiment, the second sensor distance data is data indicative of a distance along the slider moving direction F between the sensors 241A of the sensor structural bodies 241 disposed adjacently to each other between the motor drive units 24 disposed adjacently to each other. The second sensor distance data is preliminarily measured data.

In this embodiment, it is desirable that the second sensor distance data stored in the data storage parts 241Ba of the respective drivers 241B in the respective sensor structural bodies 241 of the second and third motor drive units 24-2, 24-3 be data measured based on detection data by the sensors 241A in a state where the slider 3 is disposed striding over between the sensors 241A of the sensor structural bodies 241 disposed adjacently to each other between the motor drive units 24 disposed adjacently to each other. With such a configuration, the second sensor distance data used when the sensor position calculation parts 241Be of the respective drivers 241B calculate the sensor position data is data measured directly based on detection data by the respective sensors 241A in the motor drive units 24 which the linear conveyor device 1 includes. Accordingly, accuracy of the sensor position data calculated by the sensor position calculation parts 241Be is increased.

The above-mentioned configuration is described with reference to FIG. 7. In the second motor drive unit 24-2, the data storage part 241Ba of the driver 241B in the first sensor structural body 241-1 which forms the second reference sensor structural body disposed on the most upstream side in the slider moving direction F stores data "0 (zero)" as first sensor distance data, and stores the distance XB1 as second sensor distance data.

In the second motor drive unit 24-2, the data storage parts 241Ba of the drivers 241B in the second to sixth sensor structural bodies 241-2, 241-3, 241-4, 241-5, and 241-6 which form the remaining second sensor structural bodies other than the first sensor structural body 241-1 which forms the second reference sensor structural body store the distance XB1 as the second sensor distance data, and store the following first sensor distance data. It is not always necessary that the data storage parts 241Ba of the drivers 241B in the second to sixth sensor structural bodies 241-2, 241-3, 241-4, 241-5, and 241-6 store the distance XB1 as the second sensor distance data.

In the second motor drive unit 24-2, the data storage part 241Ba of the driver 241B in the second sensor structural body 241-2 stores, as first sensor distance data, a distance XA6 between the sensor 241A of the first sensor structural body 241-1 and the sensor 241A of the second sensor structural body 241-2. The data storage part 241Ba of the driver 241B in the third sensor structural body 241-3 stores, as first sensor distance data, a distance XA7 between the sensor 241A of the second sensor structural body 241-2 and the sensor 241A of the third sensor structural body 241-3. The data storage part 241Ba of the driver 241B in the fourth sensor structural body 241-4 stores, as first sensor distance data, a distance XA8 between the sensor 241A of the third sensor structural body 241-3 and the sensor 241A of the fourth sensor structural body 241-4. The data storage part 241Ba of the driver 241B in the fifth sensor structural body 241-5 stores, as first sensor distance data, a distance XA9 between the sensor 241A of the fourth sensor structural body 241-4 and the sensor 241A of the fifth sensor structural body 241-5. The data storage part 241Ba of the driver 241B in the sixth sensor structural body 241-6 stores, as first sensor distance data, a distance XA10 between the sensor 241A of the fifth sensor structural body 241-5 and the sensor 241A of the sixth sensor structural body 241-6.

On the other hand, in the third motor drive unit 24-3, the data storage part 241Ba of the driver 241B in the first sensor structural body 241-1 which forms the second reference sensor structural body disposed on the most upstream side in the slider moving direction F stores data "0 (zero)" as first sensor distance data, and stores the distance XB2 as second sensor distance data.

In the third motor drive unit 24-3, the data storage parts 241Ba of the drivers 241B in the second to sixth sensor structural bodies 241-2, 241-3, 241-4, 241-5, and 241-6 which form the remaining second sensor structural bodies other than the first sensor structural body 241-1 which forms the second reference sensor structural body store the distance XB2 as the second sensor distance data, and store the following first sensor distance data. It is not always necessary that the data storage parts 241Ba of the drivers 241B in the second to sixth sensor structural bodies 241-2, 241-3, 241-4, 241-5, and 241-6 store the distance XB2 as the second sensor distance data.

In the third motor drive unit 24-3, the data storage part 241Ba of the driver 241B in the second sensor structural body 241-2 stores, as first sensor distance data, a distance XA11 between the sensor 241A of the first sensor structural body 241-1 and the sensor 241A of the second sensor structural body 241-2. The data storage part 241Ba of the driver 241B in the third sensor structural body 241-3 stores, as first sensor distance data, a distance XA12 between the sensor 241A of the second sensor structural body 241-2 and the sensor 241A of the third sensor structural body 241-3. The data storage part 241Ba of the driver 241B in the fourth sensor structural body 241-4 stores, as first sensor distance data, a distance XA13 between the sensor 241A of the third sensor structural body 241-3 and the sensor 241A of the fourth sensor structural body 241-4. The data storage part 241Ba of the driver 241B in the fifth sensor structural body 241-5 stores, as first sensor distance data, a distance XA14 between the sensor 241A of the fourth sensor structural body 241-4 and the sensor 241A of the fifth sensor structural body 241-5. The data storage part 241Ba of the driver 241B in the sixth sensor structural body 241-6 stores, as first sensor distance data, a distance XA15 between the sensor 241A of the fifth sensor structural body 241-5 and the sensor 241A of the sixth sensor structural body 241-6.

The sensor position calculation parts 241Be of the respective drivers 241B in the respective sensor structural bodies 241 of the second and third motor drive units 24-2, 24-3 calculate, based on the first sensor distance data and the second sensor distance data stored in the data storage parts 241Ba, sensor position data indicative of the position along the slider moving direction F of the sensor 241A which forms the sensor structural body 241 to which the sensor position calculation parts 241Be per se belongs. The sensor position data calculated by the sensor position calculation parts 241Be is stored in the data storage parts 241Ba.

Specifically, the sensor position calculation parts 241Be of the respective drivers 241B of the respective sensor structural bodies 241 of the second and third motor drive units 24-2, 24-3 respectively calculate, as sensor position data, a total value of a cumulative addition value of the first sensor distance data from the sensor 241B which forms the first sensor structural body 241-1 of the first motor drive unit 24-1 to the sensor 241B which form the sensor structural bodies 241 to which the sensor position calculation parts 241Be per se belongs and a cumulative addition value of second sensor distance data from the first motor drive unit 24-1 to the motor drive units 24-2, 24-3 to which the sensor position calculation parts 241Be per se belong.

The above-mentioned configuration is described more specifically with reference to FIG. 7. In the second motor drive unit 24-2, the sensor position calculation part 241Be of the driver 241B in the first sensor structural body 241-1 calculates, as sensor position data, a total value of a cumulative addition value of the first sensor distance data respectively indicated by the distance XA1 to the distance XA5 and the second sensor distance data indicated by the distance XB1. In the second motor drive unit 24-2, the sensor position calculation part 241Be of the driver 241B in the second sensor structural body 241-2 calculates, as sensor position data, a total value of a cumulative addition value of the first sensor distance data respectively indicated by the distance XA1 to the distance XA6 and the second sensor distance data indicated by the distance XB1. In the second motor drive unit 24-2, the sensor position calculation parts 241Be of the drivers 241B in the third to sixth sensor structural bodies 241-3 to 241-6 also calculate sensor position data in the same manner as above.

In the third motor drive unit 24-3, the sensor position calculation part 241Be of the driver 241B in the first sensor structural body 241-1 calculates, as sensor position data, a total value of a cumulative addition value of the first sensor distance data respectively indicated by the distance XA1 to the distance XA10 and a cumulative addition value of the second sensor distance data respectively indicated by the distance XB1 and the distance XB2. In the third motor drive unit 24-3, the sensor position calculation part 241Be of the driver 241B in the second sensor structural body 241-2 calculates, as sensor position data, a total value of a cumulative addition value of the first sensor distance data respectively indicated by the distance XA1 to the distance XA11 and a cumulative addition value of the second sensor distance data respectively indicated by the distance XB1 and the distance XB2. In the third motor drive unit 24-3, the sensor position calculation parts 241Be of the drivers 241B in the third to sixth sensor structural bodies 241-3 to 241-6 also calculate sensor position data in the same manner as above.

The position identification parts 241Bf of the respective drivers 241B in the respective sensor structural bodies 241 of the second and third motor drive units 24-2, 24-3 identify the position of the slider 3 based on addition data obtained by adding sensor position data calculated by the sensor position calculation parts 241Be and detection data based on output signals of the sensors 241A which form the sensor structural bodies 241 to which the position identification parts 241Bf per se belong.

Figure 8:
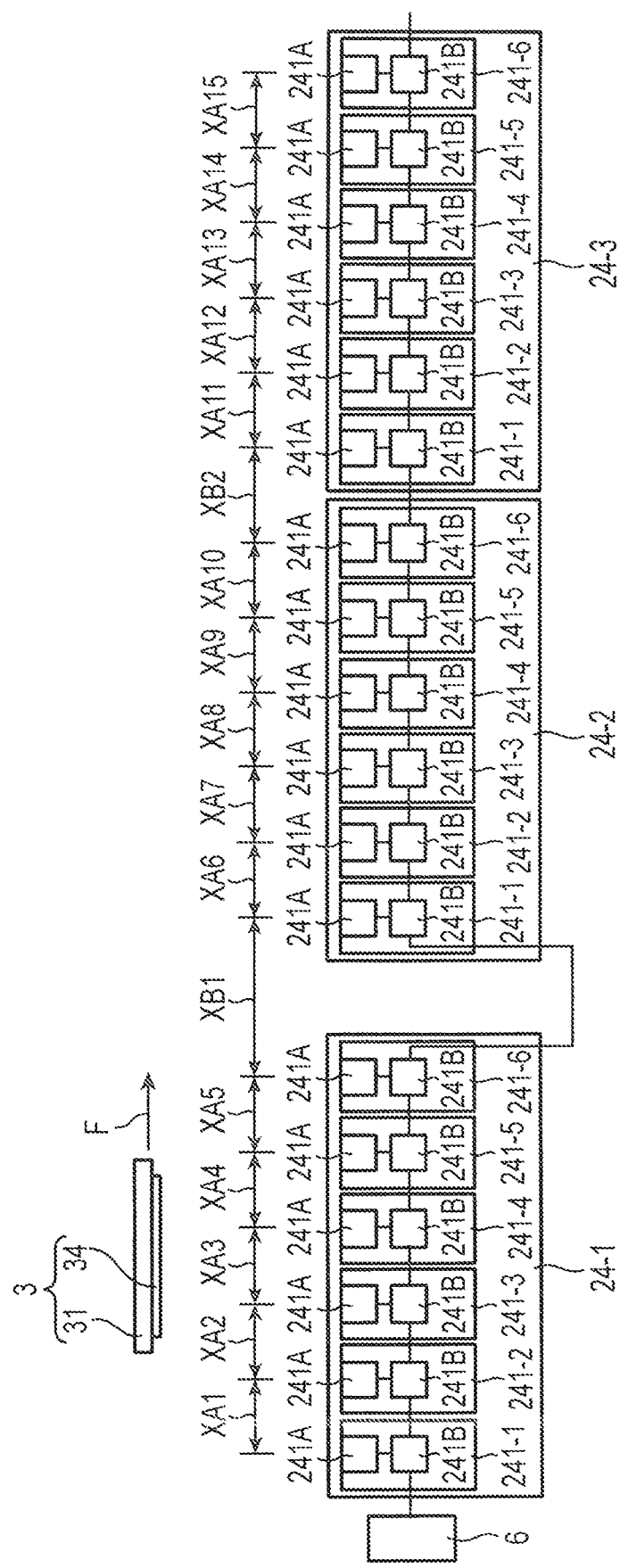
FIG. 8 is a diagram showing a modification of the connection state of the plurality of motor drive units.

In this embodiment, as a modification of a connection state of the plurality of motor drive units 24 shown in FIG. 8, in a state where three motor drive units 24 (the first to third motor drive units 24-1 to 24-3) are connected to each other, a distance XB1 (second sensor distance data) between sensors 241A which is a distance between a sensor structural body 241-6 on a most downstream side of the first motor drive unit 24-1 and a sensor structural body 241-1 on a most upstream side of the second motor drive unit 24-2 is set wider than a distance between other sensors 241A. That is, the distance between the sensors 241A is not fixed. In this manner, even when the distance XB1 between the sensors 241A at one position is set wider than the distance between the sensors 241A at other positions, it is sufficient that the scale length L2 of the scale 34 attached to the slider 3 be set greater than the distance XB1.

With such a configuration, in a state where the plurality of motor drive units 24 are connected to each other, when the slider 3 passes in a state where the slider 3 strides over between the sensor structural bodies 241 disposed adjacently to each other, the scale 34 attached to the slider 3 faces the respective sensors 241A of the respective sensor structural bodies 241. Accordingly, it is possible to identify the position of the slider 3 by the position identification parts 241Bf using detection data obtained by the respective sensors 241A. As a result, the continuous position identification of the slider 3 along the slider moving direction F can be performed.

The power supply control parts 241Bg of the respective drivers 241B in the respective sensor structural bodies 241 of the second and third motor drive units 24-2, 24-3 perform a power supply control of the linear motor stator 231 corresponding to the sensor structural bodies 241 to which the power supply control parts 241Bg per se belong based on a position identification result of the slider 3 by the position identification parts 241Bf. With such a power supply control, the linear motor which is formed of the linear motor stator 231 and the linear motor mover 32 attached to the slider 3 is driven.

In this embodiment, the power supply control part 241Bg of the driver 241B which includes the target stop position determination part 241Bd which determines that the target stop position which the target stop position data transmitted from the controller 6 indicates is the sensor facing position at which the slider 3 is stopped in an facing manner with the sensor 241A which forms the sensor structural body 241 to which the power supply control part 241g belongs performs the power supply control of the linear motor stator 231 so as to stop the slider 3 at the target stop position.

<Drive Control of Motor Drive Unit>

Figure 9:
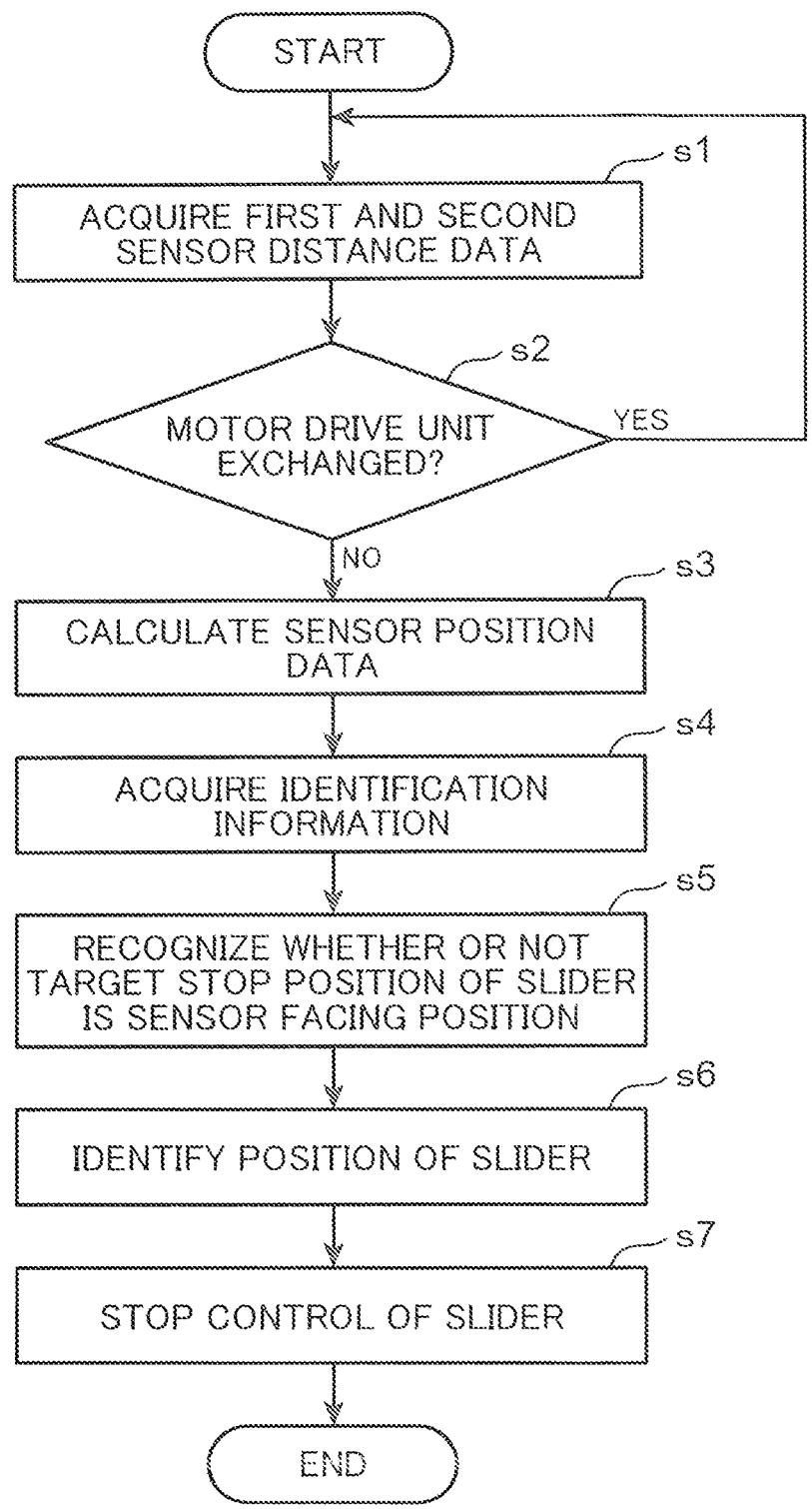
FIG. 9 is a flowchart showing an example of a control flow of the slider in the linear conveyor device in a state where the plurality of motor drive units are connected to each other.

A control operation performed by the drivers 241B of the respective sensor structural bodies 241 in the plurality of motor drive units 24 is specifically described as follows with reference to FIG. 7 to FIG. 9. FIG. 9 is a flowchart showing an example of a control flow of the slider 3 in the linear conveyor device 1 in a state where the plurality of motor drive units 24 are connected to each other.

Firstly, in a data acquisition step which is step s1, first sensor distance data and second sensor distance data indicative of distances between the sensors 241A of the sensor structural bodies 241 disposed adjacently to each other in the plurality of motor drive units 24 are preliminarily measured and acquired. The first sensor distance data and the second sensor distance data acquired in this manner are stored in the data storage part 241Ba. In this embodiment, the first sensor distance data and the second sensor distance data are directly calculated by obtaining a differential between detection data obtained by the sensors 241A in a state where the slider 3 strides over between the sensors 241A of the sensor structural bodies 241 disposed adjacently to each other in the plurality of motor drive units 24. Assume that the first sensor distance data and the second sensor distance data be approximately "100 mm".

Next, in a motor drive unit exchange step which is step s2, the controller 6 determines whether or not an exchange operation for exchanging one motor drive unit 24 in the plurality of motor drive units 24 with another motor drive unit 24 is performed. When the exchange operation of the motor drive unit 24 is not performed, processing advances to step s3. On the other hand, when the exchange operation of the motor drive unit 24 is performed, the processing returns to the data acquisition step which is step s1, and the acquisition of the first sensor distance data and the second sensor distance data is performed again after the motor drive unit 24 is exchanged.

In a sensor position calculation step which is step s3, the sensor position calculation parts 241Be of the respective drivers 241B in the respective sensor structural bodies 241 of the first motor drive unit 24-1 calculate, based on the first sensor distance data stored in the data storage part 241Ba, sensor position data of the sensors 241A which form the sensor structural bodies 241 to which the sensor position calculation parts 241Be per se belong. On the other hand, the sensor position calculation parts 241Be of the respective drivers 241B in the respective sensor structural bodies 241 of the second and third motor drive units 24-2, 24-3 calculate, based on the first sensor distance data and the second sensor distance data stored in the data storage part 241Ba, sensor position data of the sensors 241A which form the sensor structural bodies 241 to which the sensor position calculation parts 241Be per se belong.

Next, in an identification information acquisition step which is step s4, the identification information acquisition parts 241Bc of the respective drivers 241B in the respective sensor structural bodies 241 of the plurality of motor drive units 24 acquire unique identification information of the slider 3.

Next, in a target stop position determination step which is step s5, the target stop position determination part 241Bd of each driver 241B determines, based on sensor position data calculated by the sensor position calculation part 241Be, whether or not the target stop position which the target stop position data transmitted from the controller 6 and inputted to the target stop position determination part 241Bd via the input/output part 241Bb indicates is the sensor facing position. For example, assume that the target stop position which the target stop position data transmitted from the controller 6 indicates is the position corresponding to the operation position of the robot 7 which is away from the sensor 241A of the first sensor structural body 241-1 in the first motor drive unit 24-1 by "850 mm" in the slider moving direction F. In this case, the target stop positions of the slider 3 are the positions which face the respective sensors 241A of the third sensor structural body 241-3 and the fourth sensor structural body 241-4 in the second motor drive unit 24-2.

In a position identification step which is step s6, the position identification part 241Bf of the respective drivers 241B of the third sensor structural body 241-3 and the fourth sensor structural body 241-4 in the second motor drive unit 24-2 identifies the position of the slider 3 based on addition data obtained by adding sensor position data calculated by the sensor position calculation part 241Be and detection data based on output signals of the sensors 241A.

In this manner, in the plurality of motor drive units 24, when the slider 3 passes in a state where the slider 3 strides over between the sensor structural bodies 241 disposed adjacently to each other, the position of the slider 3 identified by the position identification part 241Bf in the driver 241B of one sensor structural body 241 and the position of the slider 3 identified by the position identification part 241Bf in the driver 241B of another sensor structural body 241 agree with each other. This is because with respect to addition data used for identifying the position of the slider 3, the sensor position data added to detection data obtained by the sensor 241A is data calculated based on preliminarily measured first sensor distance data and second sensor distance data. Accordingly, even when the linear conveyor device 1 adopts the configuration where the plurality of motor drive units 24 are connected to each other so that a moving path length of the slider 3 is long, it is unnecessary to apply predetermined particular correction processing of the background art for making identification results obtained by the position identification parts 241Bf agree with each other in the respective drivers 241B. Further, it is also unnecessary to perform cooperative processing between the respective motor drive parts.

Next, in a power supply control step which is step s7, the power supply control parts 241Bg of the drivers 241B of the third sensor structural body 241-3 and the fourth sensor structural body 241-4 in the second motor drive unit 24-2 perform, based on the position identification result of the slider 3 by the position identification parts 241Bf, a power supply control of the linear motor stators 231 respectively corresponding to the third sensor structural body 241-3 and the fourth sensor structural body 241-4 for stopping the slider 3 at the target stop position.

As described previously, in the configuration where the plurality of motor drive units 24 are connected to each other, in the respective drivers 241B of the sensor structural bodies 241 disposed adjacently to each other, no particular processing is necessary for making the identification results obtained by the position identification parts 241Bf agree with each other. Accordingly, it is possible to provide the linear conveyor device 1 where a drive control of the linear motor based on the position identification result of the slider 3 can be simplified.

The linear conveyor device 1 adopts the configuration where, with respect to the linear motor stator 231 of each of the plurality of respective stator units 23, the linear motor is individually subjected to a drive control by the driver 241B of each sensor structural body 241 corresponding to each linear motor stator 231 and hence, the degree of freedom in designing a moving path length of the slider 3 is high. Accordingly, the moving path length of the slider 3 can be freely designed depending on a usage and, at the same time, it is possible to flexibly cope with a change in the moving path length performed later.

In the configuration where the plurality of motor drive units 24 are connected to each other corresponding to the plurality of stator units 23 so that a moving path length of the slider 3 is extended, the sensor position calculation part 241Be of each driver 241B of the plurality of respective motor drive units 24 automatically calculate sensor position data indicative of the position of the sensor 241A which forms the sensor structural body 241 to which the sensor position calculation part 241Be per se belongs in conformity with a moving path of the slider 3. Then, in each driver 241B, the position identification part 241Bf identifies the position of the slider 3 using the calculated sensor position data, and the power supply control part 241Bg performs a drive control of the linear motor based on the identification result. Accordingly, in the configuration where the moving path length of the slider 3 is extended, it is possible to perform a drive control of the linear motor in conformity with the moving path of the slider 3.

Further, as described previously, the configuration is adopted where the sensor position calculation part 241Be of the driver 241B in each of the plurality of respective motor drive units 24 automatically calculates sensor position data which conforms with a moving path of the slider 3 and, then, the position identification parts 241Bf determine the position of the slider 3 using the sensor position data. Accordingly, for example, even when an exchange operation of the motor drive unit 24 is performed, it is unnecessary to reset the target stop position of the slider 3 which corresponds to an operation position of the robot 7 such that the target stop position of the slider 3 conforms with the moving path of the slider 3.

<Modification of Drive Control in Motor Drive Unit>

FIG. 10 is a diagram for describing a modification of the drive control of the slider 3 in the linear conveyor device. In the above-mentioned linear conveyor device 1, in the data acquisition step, first sensor distance data is directly acquired based on detection data obtained by the sensor 241A in a state where the slider 3 strides over between the sensors 241A of the sensor structural bodies 241 disposed adjacently to each other. Further, second sensor distance data is directly acquired based on detection data obtained by the sensor 241A in a state where the slider 3 strides over between the sensors 241A of the sensor structural bodies 241 disposed adjacently to each other between the motor drive units 24 disposed adjacently to each other. On the other hand, in a linear conveyor device 1A shown in FIG. 10, a correction value is calculated by referencing detection data by an external sensor 35 (external sensor detection data) with respect to an external reference scale 7 provided as a separate body from the linear conveyor device 1A, and first sensor distance data and second sensor distance data are indirectly acquired based on the correction value. The drive control is specifically described hereinafter with reference to FIG. 10.

In this embodiment, a data acquisition step includes a preparation step in which the external reference scale 7 and the external sensor 35 attached to the slider 3 are prepared; and a correction value calculation step in which correction values corresponding to the first and second sensor distance data are calculated by referencing external sensor detection data based on an output signal of the external sensor 35.

The external reference scale 7 prepared in the preparation step of the data acquisition step is a scale disposed such that the external reference scale 7 extends in the slider moving direction F (X direction) parallel to a motor drive unit 24 on which a plurality of sensor structural bodies 241 are disposed along the slider moving direction F (X direction), and is disposed in an facing manner with the slider 3. The external reference scale 7 may be, for example, a magnetic scale or an optical scale. When the external reference scale 7 is a magnetic scale, in the external reference scale 7, a plurality of permanent magnets are arranged in a row along the X direction at a predetermined pitch in a state where an N pole and an S pole are alternately changed. On the other hand, when the external reference scale 7 is an optical scale, the external reference scale 7 is a scale on which optical lattice divisions are formed. A length of the external reference scale 7 in the X direction is set equal to or greater than a length of the motor drive unit 24 in the X direction. The external reference scale 7 is disposed in a state where the external reference scale 7 is positioned such that a −X side end portion of the external reference scale 7 and a −X side end portion of the motor drive unit 24 agree with each other with respect to the X direction.

The external sensor 35 prepared in the preparation step of the data acquisition step is a sensor mounted on the slider frame 31 such that the external sensor 35 faces the external reference scale 7. The external sensor 35 detects a relative displacement with respect to the external reference scale 7, and outputs a 2-phase sinusoidal signal. The external sensor 35 may be, for example, a magnetic sensor such as a Hall element or an MR element or an optical sensor which detects an optical lattice.

Then, in the correction value calculation step of the data acquisition step, a correction value corresponding to first sensor distance data and second sensor distance data is calculated by referencing external sensor detection data based on an output signal of the external sensor 35 with respect to the external reference scale 7. Specifically, the correction value is calculated such that a position identification result of the slider 3 based on detection data by the sensor 241A of each sensor structural body 241 of the motor drive unit 24 has the same value as detection data based on an output signal of the external sensor 35 attached to the slider 3. The correction value is a value which corresponds to the first and second sensor distance data. That is, the first and second sensor distance data can be indirectly acquired based on the correction value calculated by referencing the external sensor detection data based on the output signal of the external sensor 35 with respect to the external reference scale 7.

The data acquisition step is described more specifically with reference to FIG. 10. A correction value is calculated such that a position identification result of the slider 3 based on detection data by the respective sensors 241A of the first and second sensor structural bodies 241-1, 241-2 has the same value as external sensor detection data by the external sensor 35 which detects the position corresponding to the predetermined position (for example, the center position) between the sensors 241A of the first and second sensor structural bodies 241-1, 241-2 in the external reference scale 7. First sensor distance data between the sensors 241A in the first and second sensor structural bodies 241-1, 241-2 can be indirectly acquired based on the correction value. In FIG. 10, an example is described where the slider 3 is disposed in a state that the slider 3 strides over between the sensors 241A of the first and second sensor structural bodies 241-1, 241-2, and a correction value is calculated by referencing detection data obtained by the external sensor 35 with respect to the external reference scale 7 in such a state. However, the modification is not limited to such an example. A configuration may be adopted where the slider 3 is disposed in a state where the slider 3 faces the sensor 241A of either one of the first or the second sensor structural body 241-1, 241-2, and a correction value is calculated by referencing detection data obtained by the external sensor 35 with respect to the external reference scale 7 in such a state.

A correction value is calculated such that a position identification result of the slider 3 based on detection data by the respective sensors 241A of the second and third sensor structural bodies 241-2, 241-3 has the same value as external sensor detection data by the external sensor 35 which detects the position corresponding to the predetermined position (for example, the center position) between the sensors 241A of the second and third sensor structural bodies 241-2, 241-3 in the external reference scale 7. First sensor distance data between the sensors 241A in the second and third sensor structural bodies 241-2, 241-3 can be indirectly acquired based on the correction value. In the same manner as described previously, the modification is not limited to the case where the slider 3 is disposed in a state that the slider 3 strides over between the sensors 241A of the second and third sensor structural bodies 241-2, 241-3. A configuration may be adopted where the slider 3 is disposed in a state where the slider 3 faces the sensor 241A of either one of the second or the third sensor structural body 241-2, 241-3, and a correction value is calculated by referencing detection data obtained by the external sensor 35 with respect to the external reference scale 7 in such a state.

A correction value is calculated such that a position identification result of the slider 3 based on detection data by the respective sensors 241A of the third and fourth sensor structural bodies 241-3, 241-4 has the same value as external sensor detection data by the external sensor 35 which detects the position corresponding to the predetermined position (for example, the center position) between the sensors 241A of the third and fourth sensor structural bodies 241-3, 241-4 in the external reference scale 7. First sensor distance data between the sensors 241A in the third and fourth sensor structural bodies 241-3, 241-4 can be indirectly acquired based on the correction value. In the same manner as described previously, the modification is not limited to the case where the slider 3 is disposed in a state that the slider 3 strides over between the sensors 241A of the third and fourth sensor structural bodies 241-3, 241-4. A configuration may be adopted where the slider 3 is disposed in a state where the slider 3 faces the sensor 241A of either one of the third or the fourth sensor structural body 241-3, 241-4, and a correction value is calculated by referencing detection data obtained by the external sensor 35 with respect to the external reference scale 7 in such a state.

A correction value is calculated such that a position identification result of the slider 3 based on detection data by the respective sensors 241A of the fourth and fifth sensor structural bodies 241-4, 241-5 has the same value as external sensor detection data by the external sensor 35 which detects the position corresponding to the predetermined position (for example, the center position) between the sensors 241A of the fourth and fifth sensor structural bodies 241-4, 241-5 in the external reference scale 7. First sensor distance data between the sensors 241A in the fourth and fifth sensor structural bodies 241-4, 241-5 can be indirectly acquired based on the correction value. In the same manner as described previously, the modification is not limited to the case where the slider 3 is disposed in a state that the slider 3 strides over between the sensors 241A of the fourth and fifth sensor structural bodies 241-4, 241-5. A configuration may be adopted where the slider 3 is disposed in a state where the slider 3 faces the sensor 241A of either one of the fourth or the fifth sensor structural body 241-4, 241-5, and a correction value is calculated by referencing detection data obtained by the external sensor 35 with respect to the external reference scale 7 in such a state.

In the same manner, second sensor distance data can be indirectly acquired based on a correction value calculated by referencing external sensor detection data by the external sensor 35 with respect to the external reference scale 7. The correction value calculated by referencing the external sensor detection data by the external sensor 35 with respect to the external reference scale 7 is stored in a data storage part 241Ba. When the correction data is stored in the data storage part 241Ba in this manner, the external reference scale 7 and the external sensor 35 are removed.

In the example shown in FIG. 10, a correction value is calculated by referencing external sensor detection data based on an output signal of the external sensor 35 with respect to the external reference scale 7, and first sensor distance data and second sensor distance data can be indirectly acquired based on the correction value. Accordingly, a distance between the sensors 241A of the sensor structural bodies 241 disposed adjacently to each other is considered to fall within a predetermined tolerance and hence, even when the distance between the sensors 241A does not take a fixed value, sensor position data which position identification parts 241Bf of drivers 241B in the respective sensor structural bodies 241 of the motor drive unit 24 use in identifying the position of the slider 3 is indirectly compensated. As the result, accuracy of a position identification result obtained by identifying a position of the slider 3 by the position identification parts 241Bf and accuracy of a drive control of a linear motor by power supply control parts 241Bj based on the position identification result can be increased.

The following configurations are mainly contained in the above-mentioned specific embodiment.

A linear conveyor device according to one aspect of the present disclosure includes a slider to which a linear motor mover and a scale are attached and which is configured to be movable in a predetermined moving direction; a stator unit in which a plurality of linear motor stators each of which faces the linear motor mover of the slider and forms a linear motor in cooperation with the linear motor mover are connected to each other in the moving direction; a motor drive unit in which a plurality of sensor structural bodies each of which includes a sensor which detects a relative displacement of the scale attached to the slider and a motor drive part for driving the linear motor are arranged along the moving direction corresponding to the plurality of respective linear motor stators; and a data storage part which stores first sensor distance data which is preliminarily measured. The first sensor distance data is data indicative of a distance along the moving direction between the sensors of the sensor structural bodies disposed adjacently to each other in the motor drive unit. Each of the respective motor drive parts in the motor drive unit includes a sensor position calculation part which calculates, based on the first sensor distance data, sensor position data indicative of a position of the sensor along the moving direction of the sensor which forms the sensor structural body to which the sensor position calculation part per se belongs; a position identification part which identifies the position of the slider based on addition data obtained by adding the sensor position data and detection data based on an output signal of the sensor which forms the sensor structural body to which the position identification part per se belongs; and a power supply control part which drives the linear motor by performing a power supply control of the linear motor stator which corresponds to the sensor structural body to which the power supply control part per se belongs based on an identification result by the position identification part.

According to this linear conveyor device, each linear motor stator of the stator unit forms the linear motor in cooperation with the linear motor mover attached to the slider, and the slider is moved in the predetermined moving direction using the linear motor as a drive source. The linear motor is driven by the motor drive part of each sensor structural body disposed corresponding to each linear motor stator in the motor drive unit. In such a configuration, the motor drive part in each of the plurality of sensor structural bodies includes the sensor position calculation part, the position identification part and the power supply control part.

The sensor position calculation part of each motor drive part calculates, based on first sensor distance data stored in the data storage part, sensor position data indicative of the position of the sensor along the moving direction of the sensor which forms the sensor structural body to which the sensor position calculation part per se belongs. The first sensor distance data is data indicative of a distance between the sensors of the sensor structural bodies disposed adjacently to each other in the motor drive unit, and is preliminarily measured data. The position identification part of each motor drive part identifies the position of the slider based on addition data obtained by adding sensor position data calculated by the sensor position calculation part and detection data by the sensor which forms the sensor structural body to which the position identification part per se belongs. The power supply control part of each motor drive part performs, based on an identification result by the position identification part, a power supply control of the linear motor stator corresponding to the sensor structural body to which the power supply control part per se belongs, thus driving the linear motor.

In the linear conveyor device having such a configuration, when the slider passes in a state where the slider strides over between the sensor structural bodies disposed adjacently to each other, the position of the slider identified by the position identification part in the motor drive part of one sensor structural body and the position of the slider identified by the position identification part in the motor drive part of another sensor structural body agree with each other. This is because a distance between the sensors of the sensor structural bodies disposed adjacently to each other is considered to fall within a predetermined tolerance so that even when the distance between the sensors is not set to a fixed value, with respect to addition data used for identifying the position of the slider, the sensor position data added to detection data obtained by the sensor is data calculated based on preliminarily measured first sensor distance data. Accordingly, in the respective motor drive parts of the respective sensor structural bodies disposed adjacently to each other, it is unnecessary to apply predetermined particular correction processing of the background art for making identification results obtained by the position identification parts agree with each other. Further, it is also unnecessary to perform cooperative processing between the respective motor drive parts. Accordingly, it is possible to provide the linear conveyor device where a drive control of the linear motor based on the position identification result of the slider can be simplified.

In the above-mentioned linear conveyor device, a plurality of the stator units are connected to each other along the moving direction, a plurality of the motor drive units are connected to each other corresponding to the plurality of respective stator units, and the data storage part further stores second sensor distance data which is data indicative of a distance along the moving direction between the sensors of the sensor structural bodies disposed adjacently to each other between the motor drive units disposed adjacently to each other and being preliminarily measured. In a reference motor drive unit disposed on a most upstream side in the moving direction out of the plurality of motor drive units, the sensor position calculation part of the each motor drive part calculates the sensor position data based on the first sensor distance data. Further, in the remaining motor drive units other than the reference motor drive unit of the plurality of motor drive units, the sensor position calculation part of the each motor drive part calculates the sensor position data based on the first sensor distance data and the second sensor distance data.

In this mode, the configuration is adopted where the plurality of motor drive units are connected to each other corresponding to the plurality of respective stator units. That is, the configuration where a moving path length of the slider is extended is provided. In such a configuration, the sensor position calculation part of the each motor drive part in the reference motor drive unit out of the plurality of motor drive units calculates sensor position data based on the first sensor distance data. The sensor position calculation parts of the respective motor drive parts of the remaining motor drive units other than the reference motor drive unit calculate sensor position data based on the first sensor distance data and the second sensor distance data. The second sensor distance data is data indicative of the distance between the sensors of the sensor structural bodies disposed adjacently to each other between the motor drive units disposed adjacently to each other and being preliminarily measured.

When the slider passes in a state where the slider strides over between the sensor structural bodies disposed adjacently to each other between the reference motor drive unit and the remaining motor drive unit disposed adjacently to the reference motor drive unit, or when the slider passes in a state where the slider strides over between the sensor structural bodies disposed adjacently to each other between the remaining motor drive units disposed adjacently to each other, the position of the slider identified by the position identification part in the motor drive part of one sensor structural body and the position of the slider identified by the position identification part in the motor drive part of another sensor structural body agree with each other. This is because with respect to addition data used for identifying the position of the slider, the sensor position data added to detection data obtained by the sensor is data calculated based on preliminarily measured first and the second sensor distance data. Accordingly, even when the configuration is adopted where the plurality of motor drive units are connected to each other so that a moving path length of the slider is extended, in the respective motor drive parts, it is unnecessary to apply predetermined particular correction processing of the background art for making identification results obtained by the position identification parts agree with each other. Further, it is also unnecessary to perform cooperative processing between the respective motor drive parts. Accordingly, it is possible to provide the linear conveyor device where a drive control of the linear motor based on the position identification result of the slider can be simplified.

The linear conveyor device adopts the configuration where the linear motor is individually subjected to a drive control by the motor drive parts of the respective sensor structural bodies corresponding to the respective linear motor stators for respective linear motor stators of the plurality of respective stator units and hence, the degree of freedom in designing a moving path length of the slider is high. Accordingly, the moving path length of the slider can be freely designed depending on a usage and, at the same time, it is possible to flexibly cope with a change in the moving path length performed later.

In the above-mentioned linear conveyor device, in the reference motor drive unit, the sensor position calculation part of the each motor drive part in the first reference sensor structural body disposed on a most upstream side in the moving direction out of the plurality of sensor structural bodies calculates the sensor position data using the position of the sensor which forms the first reference sensor structural body as an origin position, and the sensor position calculation part of the each motor drive part in the remaining first sensor structural bodies other than the first reference sensor structural body calculates the sensor position data by cumulatively adding the first sensor distance data from the sensor which forms the first reference sensor structural body to the sensors which form the remaining first sensor structural bodies. Further, in the remaining motor drive units, the sensor position calculation part of the each motor drive part in the second reference sensor structural body disposed on a most upstream side in the moving direction out of the plurality of sensor structural bodies and the respective remaining second sensor structural bodies other than the second reference sensor structural body calculates, as the sensor position data, a total value of a cumulative addition value of the first sensor distance data from the sensor which forms the first reference sensor structural body to the sensors which form the second reference sensor structural body and the remaining second sensor structural bodies respectively and a cumulative addition value of the second sensor distance data from the reference motor drive unit to the remaining motor drive units.

In this mode, in the configuration where the plurality of motor drive units are connected to each other corresponding to the plurality of respective stator units so that a moving path length of the slider is extended, the sensor position calculation part of the each motor drive part in the plurality of respective motor drive units calculates, in conformity with a moving path of the slider, sensor position data indicative of position of the sensor which forms the sensor structural body to which the sensor position calculation part per se belongs. Then, in each motor drive part, the position identification part identifies the position of the slider using the calculated sensor position data, and the power supply control part performs a drive control of the linear motor based on the identification result. Accordingly, in the configuration where the moving path length of the slider is extended, it is possible to perform a drive control of the linear motor in conformity with the moving path of the slider.

The above-mentioned linear conveyor device may further include a control part which is connected to the respective motor drive parts of the plurality of respective motor drive units through data communication and transmits target stop position data indicative of a target stop position of the slider to the respective motor drive parts. The respective motor drive parts further include a target stop position determination part which determines, based on the sensor position data, whether or not a target stop position which the target stop position data indicates is a sensor facing position at which the slider stops in an facing manner with the sensor which forms the sensor structural body to which the target stop position determination part per se belongs. The power supply control part of the motor drive part which includes the target stop position determination part which determines that the target stop position which the target stop position data indicates is the sensor facing position performs a power supply control of the linear motor stator so as to stop the slider at the target stop position.

In this mode, in the configuration where the plurality of motor drive units are connected to each other corresponding to the plurality of respective stator units so that a moving path length of the slider is extended, target stop position data is transmitted to the respective motor drive parts of the plurality of respective motor drive units from the control part. Then, the power supply control part of the motor drive part which determines that the target stop position of the slider is the sensor facing position at which the slider faces the sensor which forms the sensor structural body to which the power supply control part per se belongs performs a drive control of the linear motor so as to stop the slider at the target stop position on the moving path.

The above-mentioned linear conveyor device may adopt the configuration where the motor drive units disposed adjacently to each other are detachably connected to each other in the plurality of motor drive units.

In this mode, in the configuration where the plurality of motor drive units are connected to each other corresponding to the plurality of respective stator units so that a moving path length of the slider is extended, the motor drive units disposed adjacently to each other can be detachably connected to each other. Accordingly, it is possible to exchange the motor drive unit depending on a usage.

In the above-mentioned linear conveyor device, it is desirable that the respective motor drive parts in the plurality of motor drive units each include the data storage part.

In this mode, when the sensor position calculation part of each motor drive part in the plurality of respective motor drive units calculates sensor position data indicative of the position of the sensor which forms the sensor structural body to which the sensor position calculation part per se belongs, the sensor position calculation part can calculate the sensor position data by directly referencing first sensor distance data and the second sensor distance data stored in the data storage part.

In the above-mentioned linear conveyor device, it is desirable that the first sensor distance data be data measured based on the detection data obtained by the sensors of the sensor structural bodies disposed adjacently to each other in the motor drive unit in a state where the slider is disposed striding over between the sensors, and the second sensor distance data be data measured based on the detection data obtained by the sensors of the sensor structural bodies disposed adjacently to each other between the motor drive units disposed adjacently to each other in a state where the slider is disposed striding over between the sensors.

In this mode, the first sensor distance data and the second sensor distance data used when the sensor position calculation parts of the respective motor drive parts calculate the sensor position data are data measured directly based on detection data by the respective sensors in the motor drive unit which the linear conveyor device includes. Accordingly, accuracy of the sensor position data calculated by the sensor position calculation parts is increased. As the result, accuracy of a position identification result obtained by identifying a position of the slider 3 by the position identification parts using the sensor position data and accuracy of a drive control of a linear motor by power supply control parts based on the position identification result can be increased.

In the above-mentioned linear conveyor device, a length of the scale in the moving direction is set greater than the distance between the sensors indicated by the first sensor distance data and the second sensor distance data respectively.

In this mode, in the configuration where the plurality of motor drive units are connected to each other corresponding to the plurality of respective stator units, when the slider passes in a state where the slider strides over between the sensor structural bodies disposed adjacently to each other between the motor drive units disposed adjacently to each other, the scale attached to the slider faces the respective sensors of the respective sensor structural bodies. Accordingly, it is possible to identify the position of the slider by the position identification part using detection data obtained by the respective sensors. As a result, the continuous position identification of the slider along the slider moving direction can be performed.

A drive control method for a linear conveyor device according to another aspect of the present disclosure is a drive control method for a slider of a linear conveyor device which includes a slider to which a linear motor mover and a scale are attached and which is configured to be movable in a predetermined moving direction; a stator unit in which a plurality of linear motor stators each of which faces the linear motor mover of the slider and forms a linear motor in cooperation with the linear motor mover are connected to each other in the moving direction; and a motor drive unit in which a plurality of sensor structural bodies each of which includes a sensor which detects a relative displacement of the scale attached to the slider relative to the scale and a motor drive part for driving the linear motor are arranged along the moving direction corresponding to the plurality of respective linear motor stators. The drive control method for a linear conveyor device includes a data acquisition step of preliminarily measuring and acquiring first sensor distance data indicative of a distance along the moving direction between the sensors of the sensor structural bodies disposed adjacently to each other in the motor drive unit; a sensor position calculation step of making each of the respective motor drive parts in the motor drive unit calculate, based on the first sensor distance data, sensor position data indicative of a position of the sensor along the moving direction which forms the sensor structural body to which the motor drive part per se belongs; and a slider driving step of making each of the respective motor drive parts in the motor drive unit move the slider by driving the linear motor. The slider driving step includes a position identification step of identifying a position of the slider based on addition data obtained by adding the sensor position data which each of the respective motor drive parts calculates and detection data based on an output signal of the sensor which forms the sensor structural body to which the motor drive part belongs; and a power supply control step of driving the linear motor by performing a power supply control of the linear motor stator which corresponds to the sensor structural body to which the motor drive part belongs based on a particular result in the position identification step.

In the drive control method for a linear conveyor device, in the position identification step, the position of the slider is identified using addition data obtained by adding the sensor position data calculated based on the preliminarily measured first sensor distance data to the detection data obtained by the sensor. Accordingly, in the respective motor drive parts of the sensor structural bodies disposed adjacently to each other, it is unnecessary to apply predetermined particular correction processing of the background art for making position identification results of the slider agree with each other. Further, it is also unnecessary to perform cooperative processing between the respective motor drive parts. Accordingly, a drive control of the linear motor based on a position identification result of the slider can be simplified.

In the above-mentioned drive control method, in the linear conveyor device, a plurality of the stator units are connected to each other in the moving direction, and a plurality of the motor drive units are connected to each other corresponding to the plurality of respective stator units. In the data acquisition step, second sensor distance data indicative of a distance along the moving direction between the sensors of the sensor structural bodies disposed adjacently to each other between the motor drive units disposed adjacently to each other is preliminarily measured and acquired. Further, in the sensor position calculation step, in the reference motor drive unit disposed on a most upstream side in the moving direction out of the plurality of motor drive units, the each motor drive part calculates the sensor position data based on the first sensor distance data, and in the remaining motor drive units other than the reference motor drive unit in the plurality of motor drive units, the each motor drive part calculates the sensor position data based on the first sensor distance data and the second sensor distance data.

In this mode, the linear conveyor device is configured such that the plurality of the motor drive units are connected to each other corresponding to the plurality of the respective stator units so that a moving path length of the slider is extended. In the drive control method of the linear conveyor device having such a configuration, in the sensor position calculation step, the each motor drive part in the reference motor drive unit out of the plurality of motor drive units calculates sensor position data based on first sensor distance data. Further, in the sensor position calculation step, the each motor drive part in the remaining motor drive units other than the reference motor drive unit calculates sensor position data based on first sensor distance data and second sensor distance data. In such a mode, the second sensor distance data is data indicative of a distance between the sensors of the sensor structural bodies disposed adjacently to each other between the motor drive units disposed adjacently to each other, and is preliminarily measured in the data acquisition step. Accordingly, also in the drive control method for the linear conveyor device which is configured such that the plurality of motor drive units are connected to each other so that a moving path length of the slider is extended, in the respective motor drive parts of the sensor structural bodies disposed adjacently to each other, it is unnecessary to apply predetermined particular correction processing of the background art for making position identification results of the slider agree with each other. Further, it is also unnecessary to perform cooperative processing between the respective motor drive parts. Accordingly, a drive control of the linear motor based on a position identification result of the slider can be simplified.

In the above-mentioned drive control method, in the plurality of motor drive units, the motor drive units disposed adjacently to each other are detachably connected to each other. The drive control method further includes a motor drive unit exchange step of exchanging one motor drive unit out of the plurality of motor drive units with another motor drive unit. In the data acquisition step, after the motor drive unit is exchanged with another motor drive unit in the motor drive unit exchange step, the first sensor distance data and the second sensor distance data are acquired again.

In this mode, when the motor drive unit is exchanged in the motor drive unit exchange step, after such an exchange is performed, the first sensor distance data and the second sensor distance data are acquired again in the data acquisition step. Then, in the sensor position calculation step, sensor position data indicative of the position of the sensor is calculated using first sensor distance data and second sensor distance data acquired again corresponding to the exchange of the motor drive unit. In the position identification step, the position of the slider is identified using the sensor position data calculated in this manner after the exchange of the motor drive unit. Accordingly, also when the motor drive unit is exchanged, in the respective motor drive parts of the sensor structural bodies disposed adjacently to each other, it is unnecessary to apply predetermined particular correction processing of the background art for making position identification results of the slider agree with each other. Further, it is also unnecessary to perform cooperative processing between the respective motor drive parts. Accordingly, a drive control of the linear motor based on a position identification result of the slider can be simplified.

In the above-mentioned drive control method, in the data acquisition step, it is desirable that the first sensor distance data be acquired based on detection data obtained by the sensors of the sensor structural bodies disposed adjacently to each other in the motor drive unit in a state where the slider is disposed striding over between the sensors, and the second sensor distance data be acquired based on detection data obtained by the sensors of the sensor structural bodies disposed adjacently to each other between the motor drive units disposed adjacently to each other in a state where the slider is disposed striding over between the sensors.

In this mode, in the sensor position calculation step, the first sensor distance data and the second sensor distance data used when each motor drive part calculates the sensor position data are data measured directly based on detection data by each sensor in the motor drive unit which the linear conveyor device includes. Accordingly, accuracy of the sensor position data calculated in the sensor position calculation step is increased. As a result, accuracy of a position identification result of the slider identified using the sensor position data in the position identification step and accuracy of a drive control of the linear motor in a power supply control step based on the position identification result can be increased.

In the above-mentioned drive control method, the data acquisition step includes a preparation step of preparing an external reference scale which is disposed extending along the moving direction and disposed in an facing manner with the slider, and an external sensor which is attached to the slider and detects a relative displacement with respect to the external reference scale; and a correction value calculation step of calculating a correction value corresponding to the first sensor distance data and the second sensor distance data by referencing external sensor detection data based on an output signal of the external sensor.

In this mode, a correction value is calculated by referencing external sensor detection data based on an output signal of the external sensor with respect to an external reference scale, and first sensor distance data and second sensor distance data can be indirectly acquired based on the correction value. Accordingly, even when a distance between the sensors of the sensor structural bodies disposed adjacently to each other is considered to fall within a predetermined tolerance so that the distance between the sensors does not take a fixed value, sensor position data which each motor drive part uses in identifying the position of the slider is indirectly compensated. As the result, accuracy of a position identification result of the slider identified by each motor drive part and accuracy of a drive control of the linear motor by the power supply control parts based on the position identification result can be increased.

As has been described heretofore, according to the present disclosure, with respect to the linear conveyor device which uses the linear motor as the drive source, it is possible to provide the linear conveyor device and the drive control method for the linear conveyor device where the position of the slider is identified without applying particular correction processing so that a drive control of the linear motor based on the position of the slider can be simplified.

What is claimed is:

1. A linear conveyor device comprising:
a slider to which a linear motor mover and a scale are attached and is configured to be movable in a predetermined moving direction;
a stator unit in which a plurality of linear motor stators, each of which faces the linear motor mover of the slider and forms a linear motor in cooperation with the linear motor mover, are connected to each other in the moving direction;
a motor drive unit in which a plurality of sensor structural bodies, each of which includes a sensor which detects a relative displacement of the scale attached to the slider and a motor driver configured to drive the linear motor, are arranged along the moving direction corresponding to the plurality of respective linear motor stators; and
a data storage configured to store first sensor distance data which is preliminarily measured, the first sensor distance data being data indicative of a distance along the moving direction between the sensors of the sensor structural bodies disposed adjacently to each other in the motor drive unit, wherein
each of the respective motor driver in the motor drive unit includes:
a sensor position calculator configured to calculate, based on the first sensor distance data, sensor position data indicative of a position of the sensor along the moving direction of the sensor which forms the sensor structural body to which the sensor position calculator belongs;
a position identifier configured to identify the position of the slider based on addition data obtained by adding the sensor position data and detection data based on an output signal of the sensor which forms the sensor structural body to which the position identifier belongs; and
a power supply controller configured to drive the linear motor by performing a power supply control of the linear motor stator which corresponds to the sensor structural body to which the power supply controller belongs based on an identification result by the position identifier.

2. The linear conveyor device according to claim 1, wherein
a plurality of the stator units are connected to each other along the moving direction,
a plurality of the motor drive units are connected to each other corresponding to the plurality of respective stator units,
the data storage is further configured to store second sensor distance data which is data indicative of a distance along the moving direction between the sensors of the sensor structural bodies disposed adjacently to each other between the motor drive units disposed adjacently to each other and being preliminarily measured, in a reference motor drive unit disposed on a most upstream side in the moving direction out of the plurality of motor drive units, the sensor position calculator of the each motor driver calculates the sensor position data based on the first sensor distance data, and in the remaining motor drive units other than the reference motor drive unit of the plurality of motor drive units, the sensor position calculator of the each motor driver calculates the sensor position data based on the first sensor distance data and the second sensor distance data.

3. The linear conveyor device according to claim 2, wherein in the reference motor drive unit, the sensor position calculator of the each motor driver in the first reference sensor structural body disposed on a most upstream side in the moving direction out of the plurality of sensor structural bodies calculates the sensor position data using the position of the sensor which forms the first reference sensor structural body as an origin position, the sensor position calculator of the each motor driver in the remaining first sensor structural bodies other than the first reference sensor structural body calculates the sensor position data by cumulatively adding the first sensor distance data from the sensor which forms the first reference sensor structural body to the sensors which form the remaining first sensor structural bodies, and in the remaining motor drive units, the sensor position calculator of the each motor driver in the second reference sensor structural body disposed on a most upstream side in the moving direction out of the plurality of sensor structural bodies and the respective remaining second sensor structural bodies other than the second reference sensor structural body calculates, as the sensor position data, a total value of a cumulative addition value of the first sensor distance data from the sensor which forms the first reference sensor structural body to the sensors which form the second reference sensor structural body and the remaining second sensor structural bodies respectively and a cumulative addition value of the second sensor distance data from the reference motor drive unit to the remaining motor drive units.

4. The linear conveyor device according to claim 3, further comprising a controller which is connected to the respective motor drivers of the plurality of respective motor drive units through data communication and transmits target stop position data indicative of a target stop position of the slider to the respective motor drivers, wherein the respective motor drivers further include a target stop position determinator, based on the sensor position data, whether or not a target stop position which the target stop position data indicates is a sensor facing position at which the slider stops in an facing manner with the sensor which forms the sensor structural body to which the target stop position determinator belongs, and the power supply controller of the motor driver which includes the target stop position determinator which determines that the target stop position which the target stop position data indicates is the sensor facing position performs a power supply control of the linear motor stator so as to stop the slider at the target stop position.

5. The linear conveyor device according to claim 2, wherein the motor drive units disposed adjacently to each other are detachably connected to each other in the plurality of motor drive units.

6. The linear conveyor device according to claim 2, wherein the respective motor drivers in the plurality of motor drive units each include the data storage.

7. The linear conveyor device according to claim 2, wherein the first sensor distance data is data measured based on the detection data obtained by the sensors of the sensor structural bodies disposed adjacently to each other in the motor drive unit in a state where the slider is disposed striding over between the sensors, and the second sensor distance data is data measured based on the detection data obtained by the sensors of the sensor structural bodies disposed adjacently to each other between the motor drive units disposed adjacently to each other in a state where the slider is disposed striding over between the sensors.

8. The linear conveyor device according to claim 2, wherein a length of the scale in the moving direction is set greater than the distance between the sensors indicated by the first sensor distance data and the second sensor distance data respectively.

9. A drive control method for a linear conveyor device being a drive control method for a slider of a linear conveyor device which includes:

a slider to which a linear motor mover and a scale are attached and which is configured to be movable in a predetermined moving direction;

a stator unit in which a plurality of linear motor stators each of which faces the linear motor mover of the slider and forms a linear motor in cooperation with the linear motor mover are connected to each other in the moving direction; and a motor drive unit in which a plurality of sensor structural bodies each of which includes a sensor which detects a relative displacement of the scale attached to the slider and a motor driver configured to drive the linear motor are arranged along the moving direction corresponding to the plurality of respective linear motor stators, the drive control method comprising:

acquiring data by preliminarily measuring and acquiring first sensor distance data indicative of a distance along the moving direction between the sensors of the sensor structural bodies disposed adjacently to each other in the motor drive unit;

calculating a sensor position by making each of the respective motor drivers in the motor drive unit calculate, based on the first sensor distance data, sensor position data indicative of a position of the sensor along the moving direction which forms the sensor structural body to which the motor driver belongs; and performing slider driving by making each of the respective motor drivers in the motor drive unit move the slider by driving the linear motor, wherein the slider driving includes:

a position identification operation of identifying a position of the slider based on addition data obtained by adding the sensor position data which each of the respective motor drivers calculates and detection data based on an output signal of the sensor which forms the sensor structural body to which the motor drivers belong; and driving the linear motor by performing a power supply control of the linear motor stator which corresponds to the sensor structural body to which the motor drivers belong based on a particular result in the position identification operation.

10. The drive control method for a linear conveyor device according to claim 9, wherein in the linear conveyor device, a plurality of the stator units are connected to each other in the moving direction, and a plurality of the motor drive units are connected to each other corresponding to the plurality of respective stator units, during the data acquiring, second sensor distance data indicative of a distance along the moving direction between the sensors of the sensor structural bodies disposed adjacently to each other between the motor drive units disposed adjacently to each other is preliminarily measured and acquired, and during the sensor position calculating, in the reference motor drive unit disposed on a most upstream side in the moving direction out of the plurality of motor drive units, the each motor driver calculates the sensor position data based on the first sensor distance data, and in the remaining motor drive units other than the reference motor drive unit in the plurality of motor drive units, the each motor driver calculates the sensor position data based on the first sensor distance data and the second sensor distance data.

11. The drive control method for a linear conveyor device according to claim 10, wherein in the plurality of motor drive units, the motor drive units disposed adjacently to each other are detachably connected to each other, the drive control method further includes exchanging one motor drive unit out of the plurality of motor drive units with another motor drive unit, and during the data acquiring, after the motor drive unit is exchanged with another motor drive unit during the motor drive unit exchanging, the first sensor distance data and the second sensor distance data are acquired again.

12. The drive control method for a linear conveyor device according to claim 10, wherein during the data acquiring, the first sensor distance data is acquired based on detection data obtained by the sensors of the sensor structural bodies disposed adjacently to each other in the motor drive unit in a state where the slider is disposed striding over between the sensors, and the second sensor distance data is acquired based on detection data obtained by the sensors of the sensor structural bodies disposed adjacently to each other between the motor drive units disposed adjacently to each other in a state where the slider is disposed striding over between the sensors.

13. The drive control method for a linear conveyor device according to claim 10, wherein the data acquiring includes:

preparing an external reference scale which is disposed extending along the moving direction and disposed in an facing manner with the slider, and an external sensor which is attached to the slider and detects a relative displacement with respect to the external reference scale; and calculating a correction value corresponding to the first sensor distance data and the second sensor distance data by referencing external sensor detection data based on an output signal of the external sensor.

* * * * *